United States Patent
Jin et al.

(10) Patent No.: US 12,160,914 B2
(45) Date of Patent: *Dec. 3, 2024

(54) METHOD AND APPARATUS FOR REPORTING UE CAPABILITY FOR MR-DC IN NR SYSTEM

(71) Applicant: SAMSUNG ELECTRONICS CO., LTD., Suwon-si (KR)

(72) Inventors: Seungri Jin, Suwon-si (KR); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,578

(22) Filed: May 30, 2022

(65) Prior Publication Data

US 2022/0295584 A1 Sep. 15, 2022

Related U.S. Application Data

(63) Continuation of application No. 16/833,335, filed on Mar. 27, 2020, now Pat. No. 11,350,473.

(30) Foreign Application Priority Data

Mar. 28, 2019 (KR) ........................ 10-2019-0035901

(51) Int. Cl.
*H04W 8/24* (2009.01)
*H04W 76/15* (2018.01)
(52) U.S. Cl.
CPC ............. *H04W 76/15* (2018.02); *H04W 8/24* (2013.01)

(58) Field of Classification Search
CPC ....... H04W 8/22; H04W 76/15; H04W 76/16; H04W 8/24; H04W 88/06
See application file for complete search history.

(56) References Cited

U.S. PATENT DOCUMENTS 10,694,580 B2 6/2020 Hwang et al.
11,659,379 B2 * 5/2023 Ozturk ................. H04W 76/27
370/329

(Continued)

FOREIGN PATENT DOCUMENTS

| CN | 109314966 A | 2/2019 |
|---|---|---|
| WO | 2016/078969 A1 | 5/2016 |

OTHER PUBLICATIONS

"5G; NR; Radio Resource Control (RRC); Protocol specification (3GPP TS 38.331 version 15.4.0 Release 15)", ETSI TS 138 331 v15.4.0 (Apr. 2019), 472 pages.

(Continued)

*Primary Examiner* — Congvan Tran

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to an embodiment the disclosure considers all the procedures of reporting a UE capability for MR-DC in a method in which a UE reports its own capability.

20 Claims, 23 Drawing Sheets

(56) References Cited

U.S. PATENT DOCUMENTS

| | | | |
|---|---|---|---|
| 2017/0339555 A1 | 11/2017 | Henttonen et al. | |
| 2018/0084539 A1* | 3/2018 | Kubota | H04W 72/51 |
| 2018/0092085 A1 | 3/2018 | Shaheen et al. | |
| 2018/0279309 A1 | 9/2018 | Takahashi et al. | |
| 2018/0343697 A1 | 11/2018 | Hsu et al. | |
| 2019/0081657 A1 | 3/2019 | Zeng et al. | |
| 2019/0124572 A1 | 4/2019 | Park et al. | |
| 2020/0260265 A1* | 8/2020 | Jin | H04W 8/24 |
| 2020/0336889 A1 | 10/2020 | Liang et al. | |
| 2020/0344832 A1 | 10/2020 | Hu et al. | |
| 2021/0329444 A1* | 10/2021 | Wiemann | H04W 8/24 |
| 2021/0392713 A1* | 12/2021 | Takahashi | H04W 72/51 |
| 2022/0070661 A1* | 3/2022 | Liu | H04L 12/00 |
| 2022/0086625 A1* | 3/2022 | Jin | H04W 72/04 |
| 2023/0239683 A1* | 7/2023 | Xu | H04W 8/22 370/328 |

OTHER PUBLICATIONS

Samsung, "NR LD UE capability transfer issues remaining from RAN2 eMail 104#66", 3GPP TSG-RAN WG2 meeting #105, Feb. 25-Mar. 1, 2019, R2-1901175, 6 pages.

Samsung, "Clarification on compiling the candidate band combinations", Change Request, 3GPP TSG-RAN WG2 Meeting #105, Feb. 25-Mar. 1, 2019, R2-1901154, 6 pages.

Intel Corporation, "Updates on UE capabilities", Change Request, 3GPP TSG-RAN WG2#101, Feb. 26-Mar. 2, 2018, R2-1804072, 19 pages.

International Search Report dated Jul. 2, 2020 in connection with International Patent Application No. PCT/KR2020/004267, 3 pages.

Written Opinion of the International Searching Authority dated Jul. 2, 2020 in connection with International Patent Application No. PCT/KR2020/004267, 6 pages.

European Patent Office, "Supplementary European Search Report" issued Apr. 7, 2022, in connection with European Patent Application No. 20779078.3, 8 pages.

Decision of Patent dated Sep. 17, 2023, in connection with Korean Patent Application No. 10-2019-0035901, 7 pages.

Office Action dated Oct. 27, 2023, in connection with Chinese Patent Application No. 202080025429.X, 11 pages.

Nokia et al., "UE capability enquiry/reporting in NR RRC [N.037, N.038, N.040, N.045, N.046, N.221, N.222]," 3GPP TSG-RAN WG2 NR Adhoc 1801, R2-1800831, Vancouver, Canada, Jan. 2018, 6 pages.

Communication under Rule 71(3) EPC dated Mar. 26, 2024, in connection with European Patent Application No. 20779078.3, 8 pages.

Ericsson, "Email discussion 103bis#23: Relation of feature sets and band combinations", Tdoc R2-18XXXXX, 3GPP TSG-RAN WG2 #103bis, Chengdu, China, Oct. 8-12, 2018, 20 pages.

Notice of Allowance issued Jun. 13, 2024, in connection with Chinese Patent Application No. 202080025429.X, 8 pages.

\* cited by examiner

METHOD AND APPARATUS FOR REPORTING UE CAPABILITY FOR MR-DC IN NR SYSTEM

CROSS-REFERENCE TO RELATED APPLICATION

This application is a continuation of application Ser. No. 16/833,335, now U.S. Pat. No. 11,350,473 issued May 31, 2022, which is based on and claims priority under 35 U.S.C. § 119 to Korean Patent Application No. 10-2019-0035901, filed on Mar. 28, 2019, in the Korean Intellectual Property Office, the disclosures of which are herein incorporated by reference in their entirety.

BACKGROUND

1. Field

The disclosure relates to a mobile communication system, and more particularly the disclosure considers all the procedures of reporting a UE capability for multi-radio access technology (RAT)-dual connectivity (MR-DC) in a method in which a UE reports its own capability. EUTRA-NR (EN)-DC, next generation radio access network (NG-RAN)-EUTRA-NR-DC, NR-EUTRA (NE)-DC, and NR-NR (NR)-DC are included in the scope of the MR-DC.

2. Technical Background

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT), where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

According to certain embodiments of this disclosure, if a UE receives an RRC UE capability request message indicating reporting of a UE capability for a radio access technology (RAT) type and a band type from a base station in an NR system, and more particularly, if the UE receives a request for UE capability for a plurality of RATs, included in a plurality of containers, with respect to a series of processes of generating candidate band combinations and generating and transferring a feature set and a feature set combination, which are performed by the UE, a procedure of processing late drop issues (MR-DC: NGEN-DC, NE-DC, and NR-DC), which are not included in the current standard, is not defined. If the existing procedure of reporting a UE capability is used as it is, there may be a procedural problem in processing UE capability corresponding to MR-DC. Accordingly, the disclosure reviews all the procedures and proposes possible solutions therefor.

The above information is presented as background information only to assist with an understanding of the disclosure. No determination has been made, and no assertion is made, as to whether any of the above might be applicable as prior art with regard to the disclosure.

In order to solve problems such as described above, certain embodiments according to this disclosure propose a method by a terminal in a wireless communication system, the method including receiving, from a base station, a user equipment (UE) capability enquiry message including radio access technology (RAT) type information and filtering information, generating at least one candidate band combination (BC) list based on the RAT type information and the filtering information, generating UE capability information based on the generated combination BC list and transmitting, to the base station, the generated UE capability information.

Meanwhile, according to various embodiments of the disclosure, a method by a base station in a wireless communication system includes including transmitting, to a terminal, a user equipment (UE) capability enquiry message including radio access technology (RAT) type information and filtering information, in case that at least one candidate band combination (BC) list is generated based on the RAT type information and the filtering information, receiving, from the terminal, UE capability information which is generated based on the at least one combination BC list.

Meanwhile, according to some embodiments of the disclosure, a terminal in a wireless communication system includes a transceiver and a controller configured to receive, from a base station via the transceiver, a user equipment (UE) capability enquiry message including radio access technology (RAT) type information and filtering information, generate at least one candidate band combination (BC) list based on the RAT type information and the filtering information, generate UE capability information based on the generated combination BC list and transmit, to the base station via the transceiver, the generated UE capability information.

Meanwhile, according to various embodiments of the disclosure, a base station in a wireless communication system includes a transceiver and a controller configured to transmit, to a terminal via the transceiver, a user equipment (UE) capability enquiry message including radio access technology (RAT) type information and filtering information, in case that at least one candidate band combination (BC) list is generated based on the RAT type information and the filtering information, receive, from the terminal via the transceiver, UE capability information which is generated based on the at least one combination BC list.

According to some embodiments, if an NR UE receives an instruction of reporting a UE capability for MR-DC from a base station, a procedure of UE capability reporting performed by the UE can be clearly defined, and accordingly the UE can accurately transmit its own capability and a base station can correctly understand the corresponding UE capability and provide suitable configuration information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
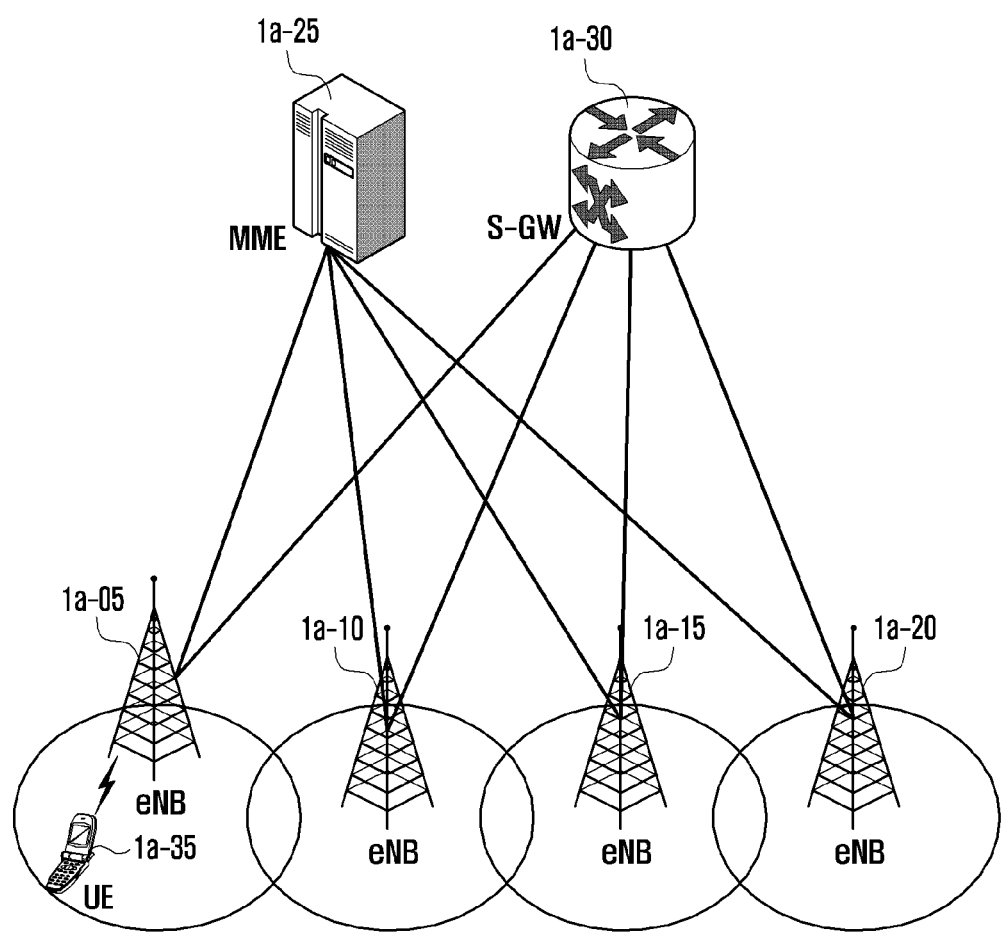
FIG. 1A illustrates the structure of an example of an LTE system provided for reference to explain aspects of various embodiments of this disclosure.
Figure 1B:
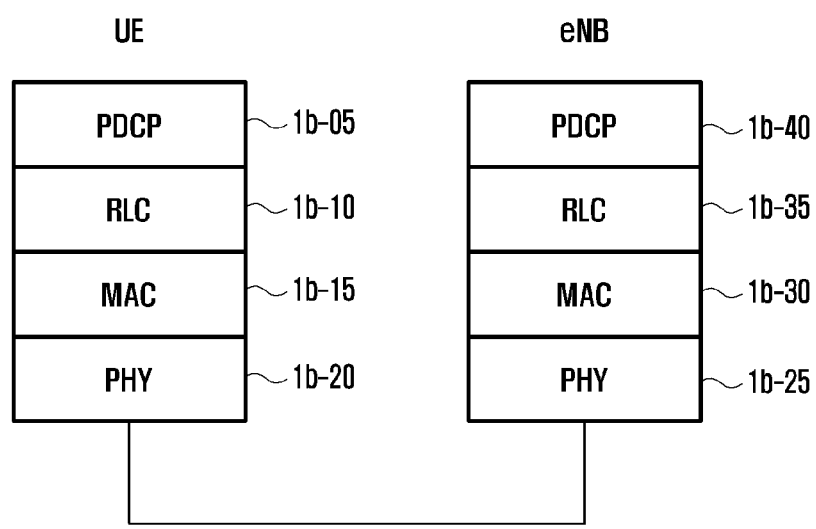
FIG. 1B illustrates an example of radio protocol structure in an LTE system provided according to various embodiments of this disclosure.
Figure 1C:
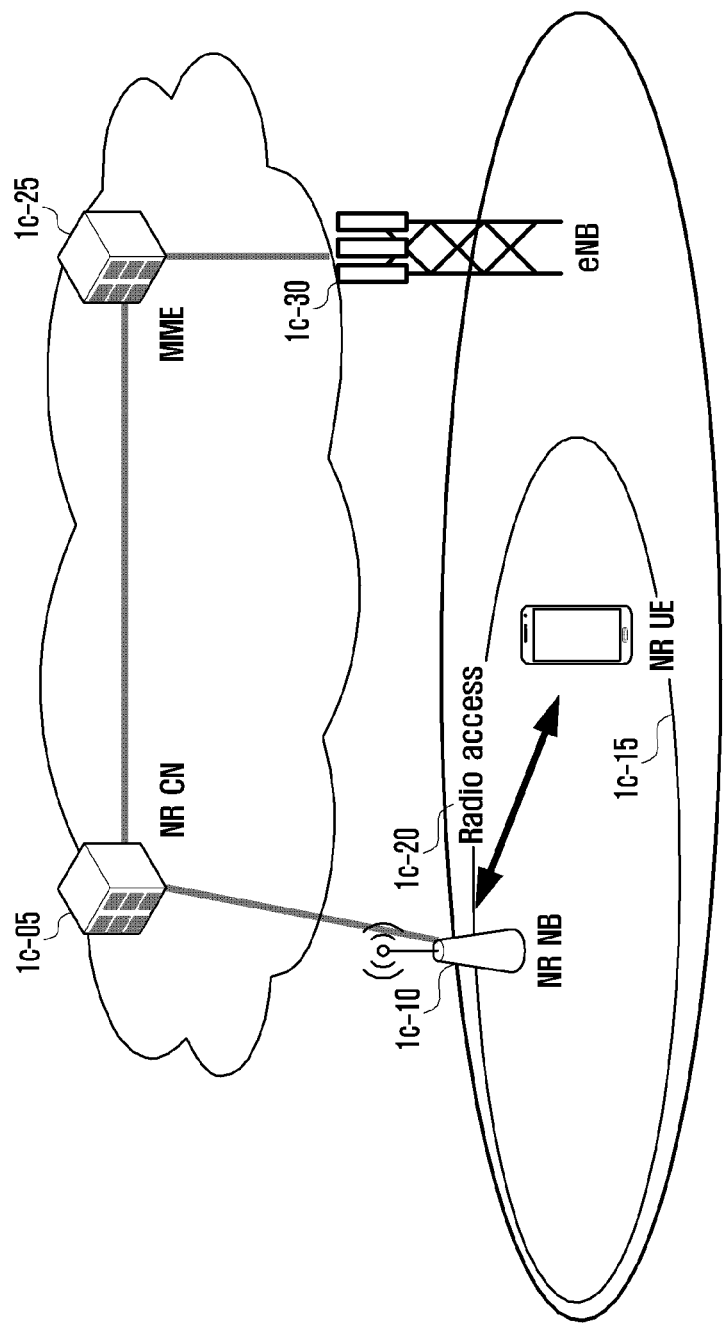
FIG. 1C illustrates an example of a structure of a next generation mobile communication system according to various embodiments of this disclosure.
Figure 1D:
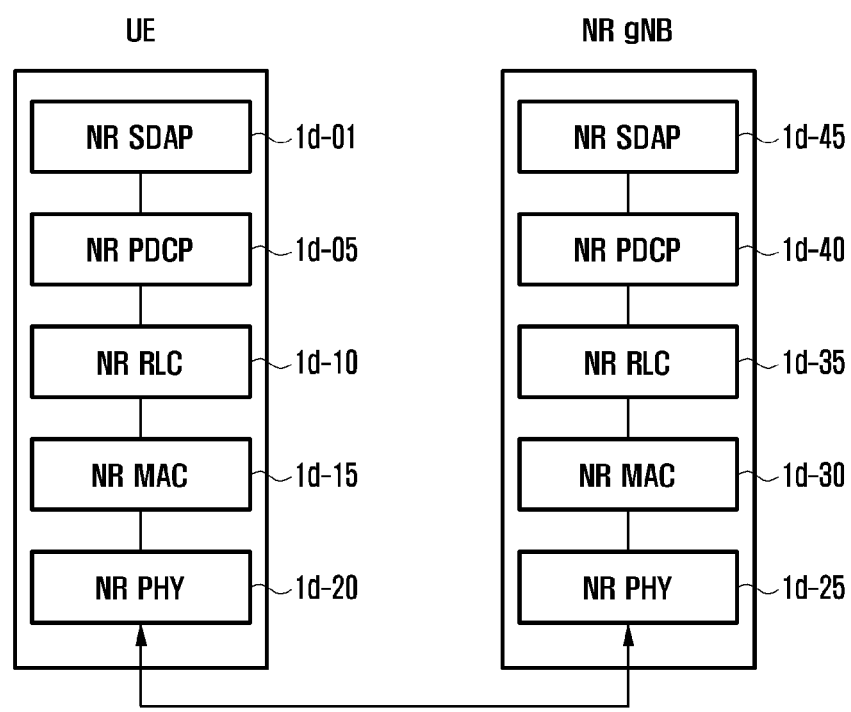
FIG. 1D illustrates an example of a radio protocol structure of a next generation mobile communication system according to some embodiments of this disclosure.
Figure 1E:
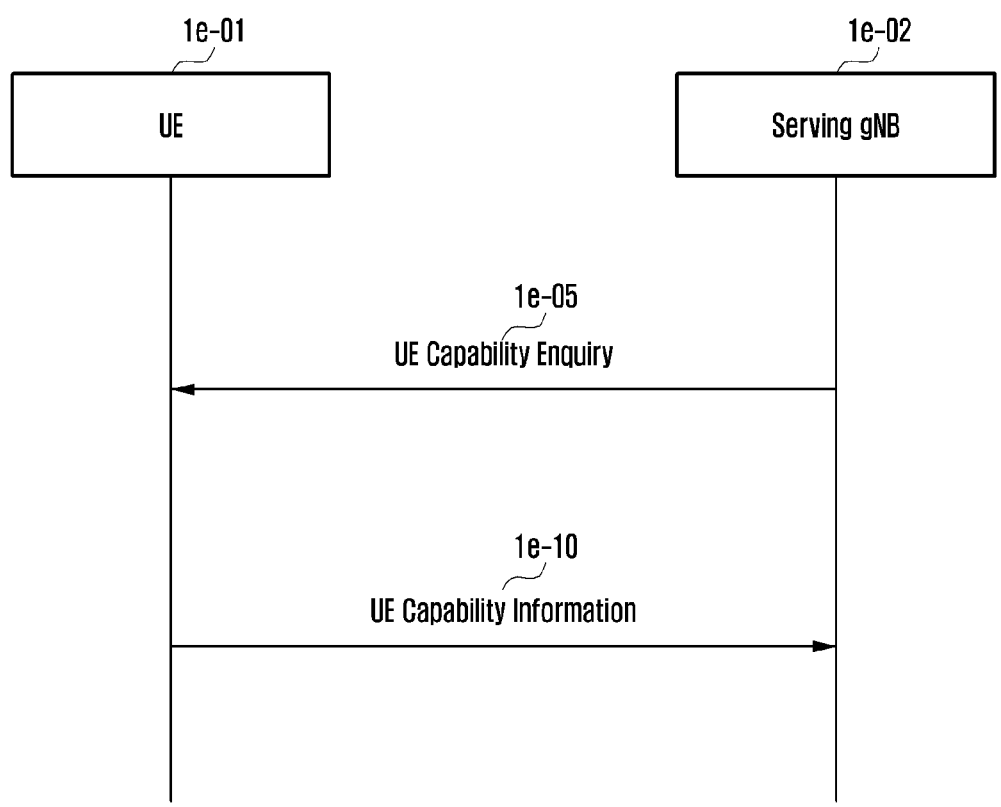
FIG. 1E illustrates an example of the structure of a message for reporting a UE capability in an NR system according to various embodiments of this disclosure.
Figure 1F:
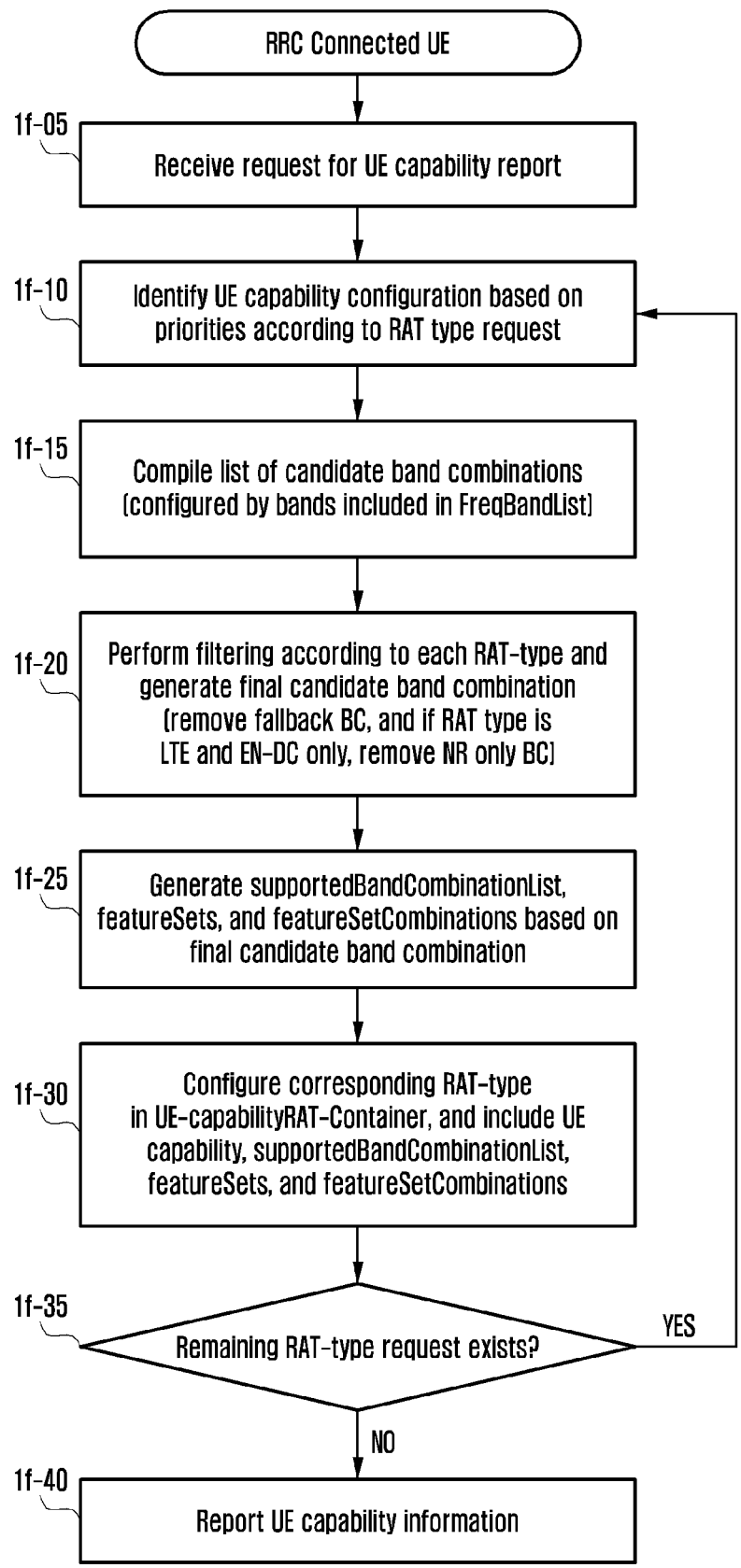
FIG. 1F illustrates operations of methods according to embodiments of this disclosure, including operations of reporting a UE capability by a UE if a plurality of RAT types are requested via one UECapabilityEnquiry, defined in a current NR system.
Figure 1G:
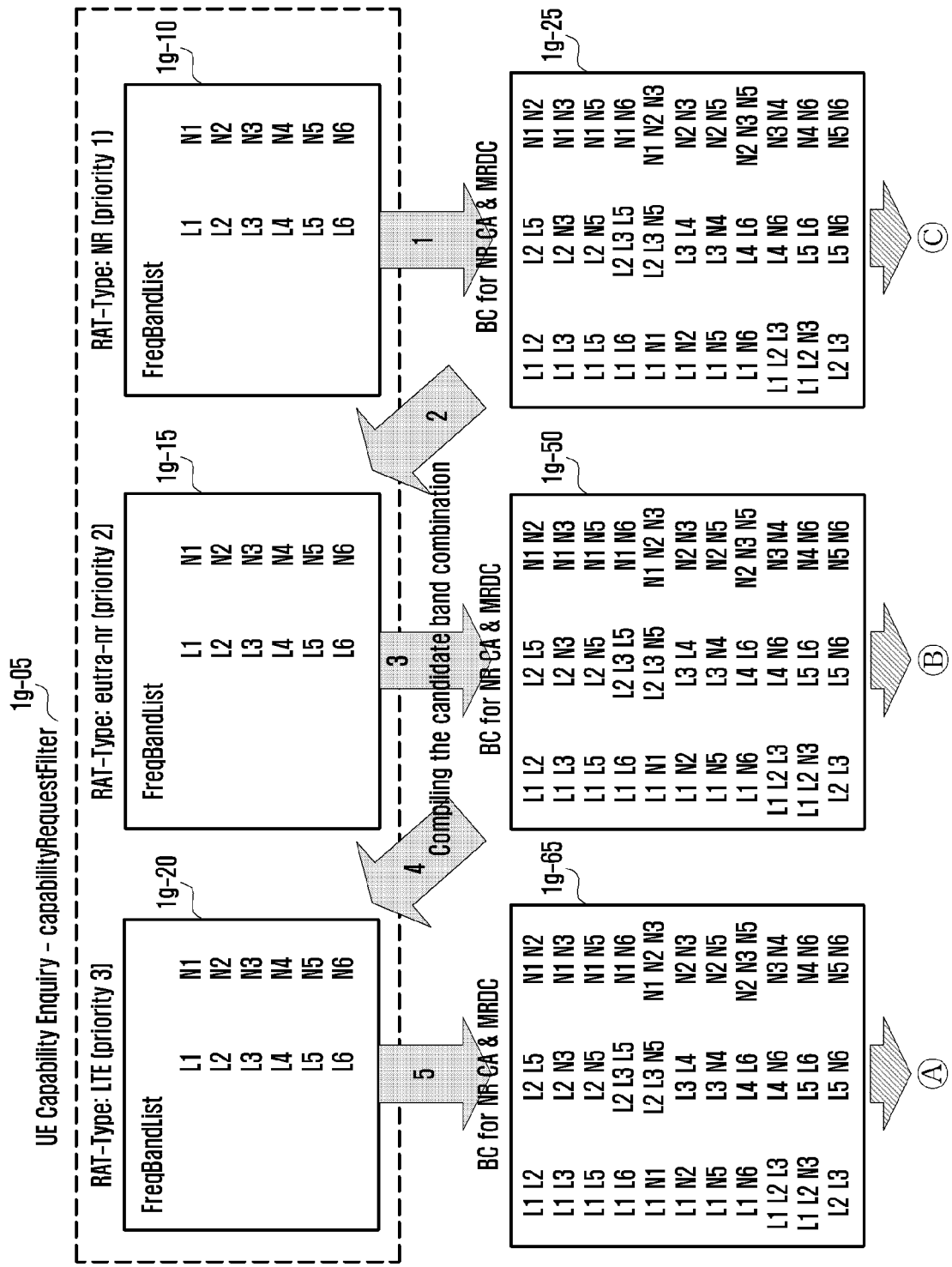
FIG. 1GA illustrates operations of reporting a UE capability by a UE if a plurality of RAT types are requested via one UECapabilityEnquiry, defined in a current NR system according to various embodiments of this disclosure, FIG. 1GB illustrates operations of reporting a UE capability by a UE if a plurality of RAT types are requested via one UECapabilityEnquiry, defined in a current NR system according to certain embodiments of this disclosure and FIG. 1GC illustrates operations of reporting a UE capability by a UE if a plurality of RAT types are requested via one UECapabilityEnquiry, defined in a current NR system according to certain embodiments of this disclosure.
Figure 1G:
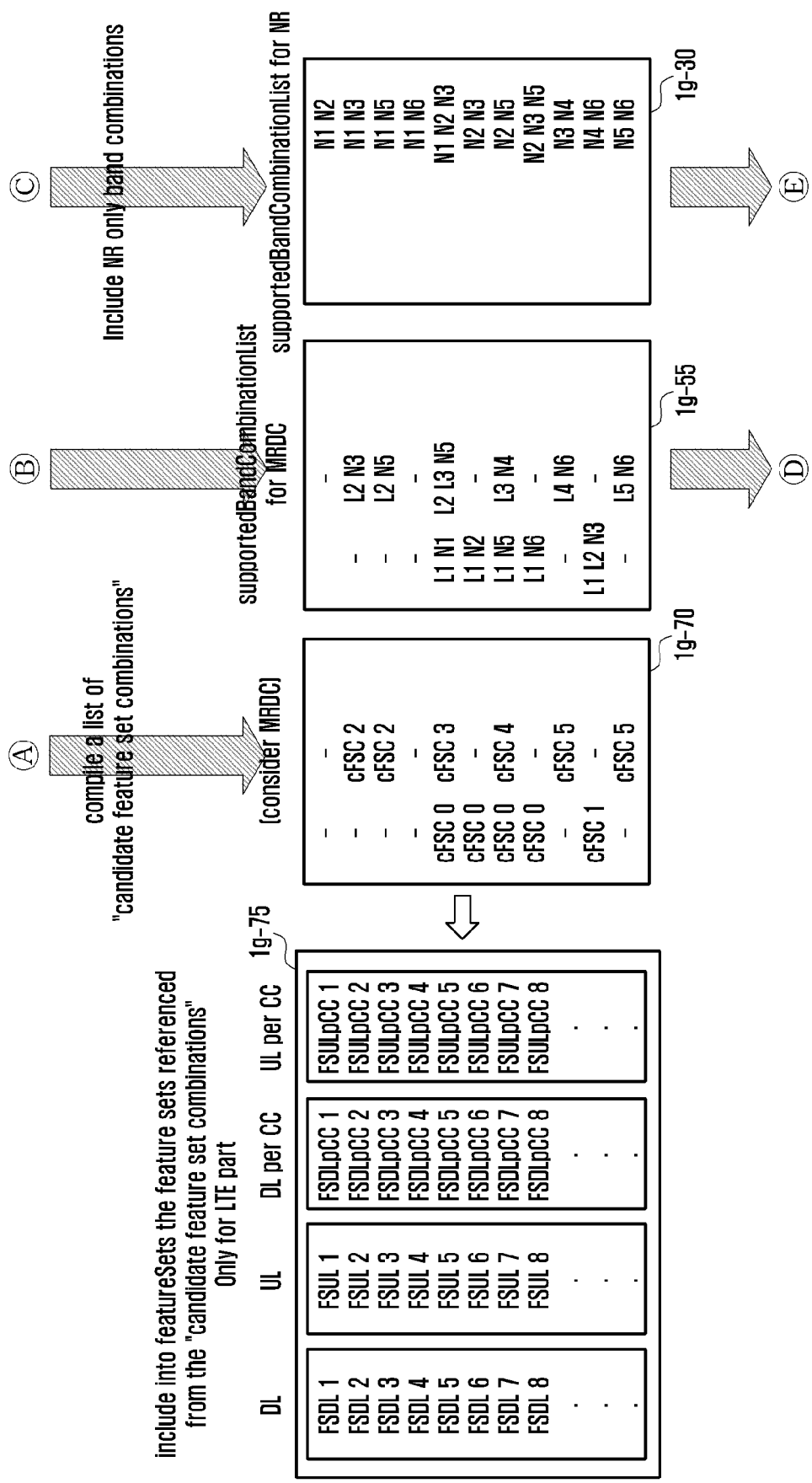
Figure 1G:
Figure 1G:
Figure 1H:
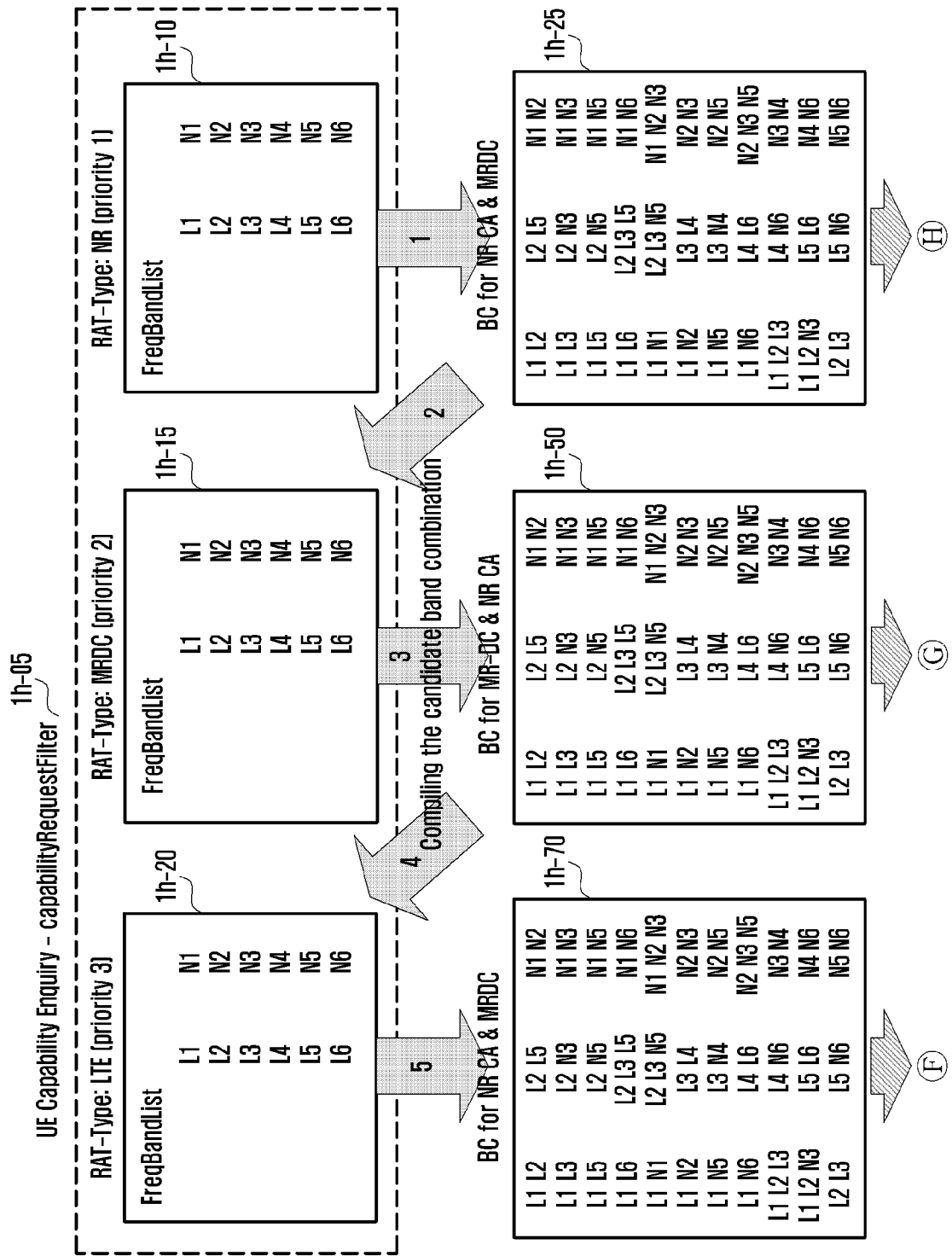
FIG. 1HA illustrates operations of configuring and reporting a UE capability by a UE if a plurality of RAT types are requested via one UECapabilityEnquiry according to certain embodiments of this disclosure, FIG. 1HB illustrates operations of configuring and reporting a UE capability by a UE if a plurality of RAT types are requested via one UECapabilityEnquiry according to certain embodiments of this disclosure and FIG. 1HC illustrates operations of configuring and reporting a UE capability by a UE if a plurality of RAT types are requested via one UECapabilityEnquiry according to certain embodiments of this disclosure.
Figure 1H:
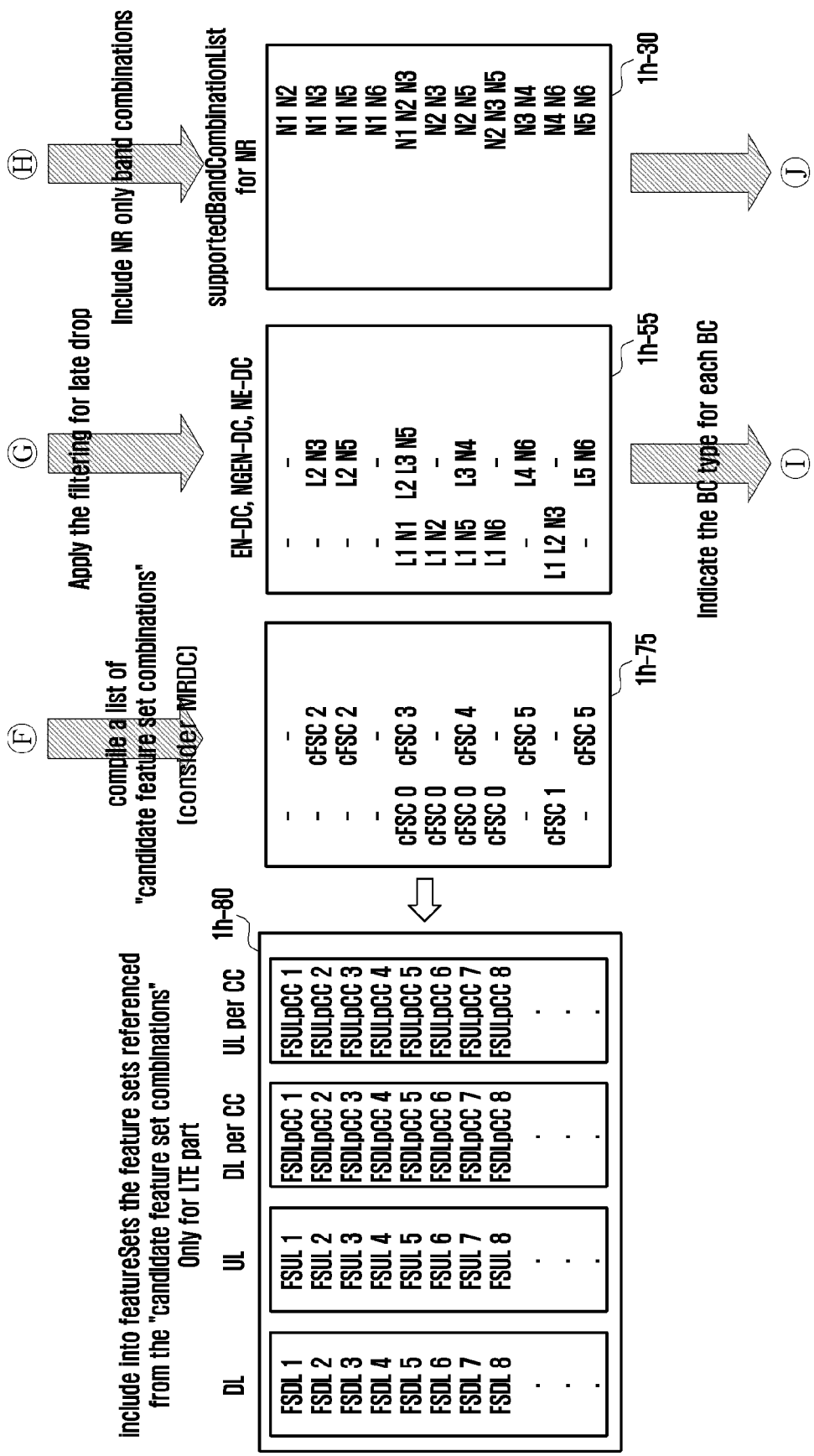
Figure 1H:
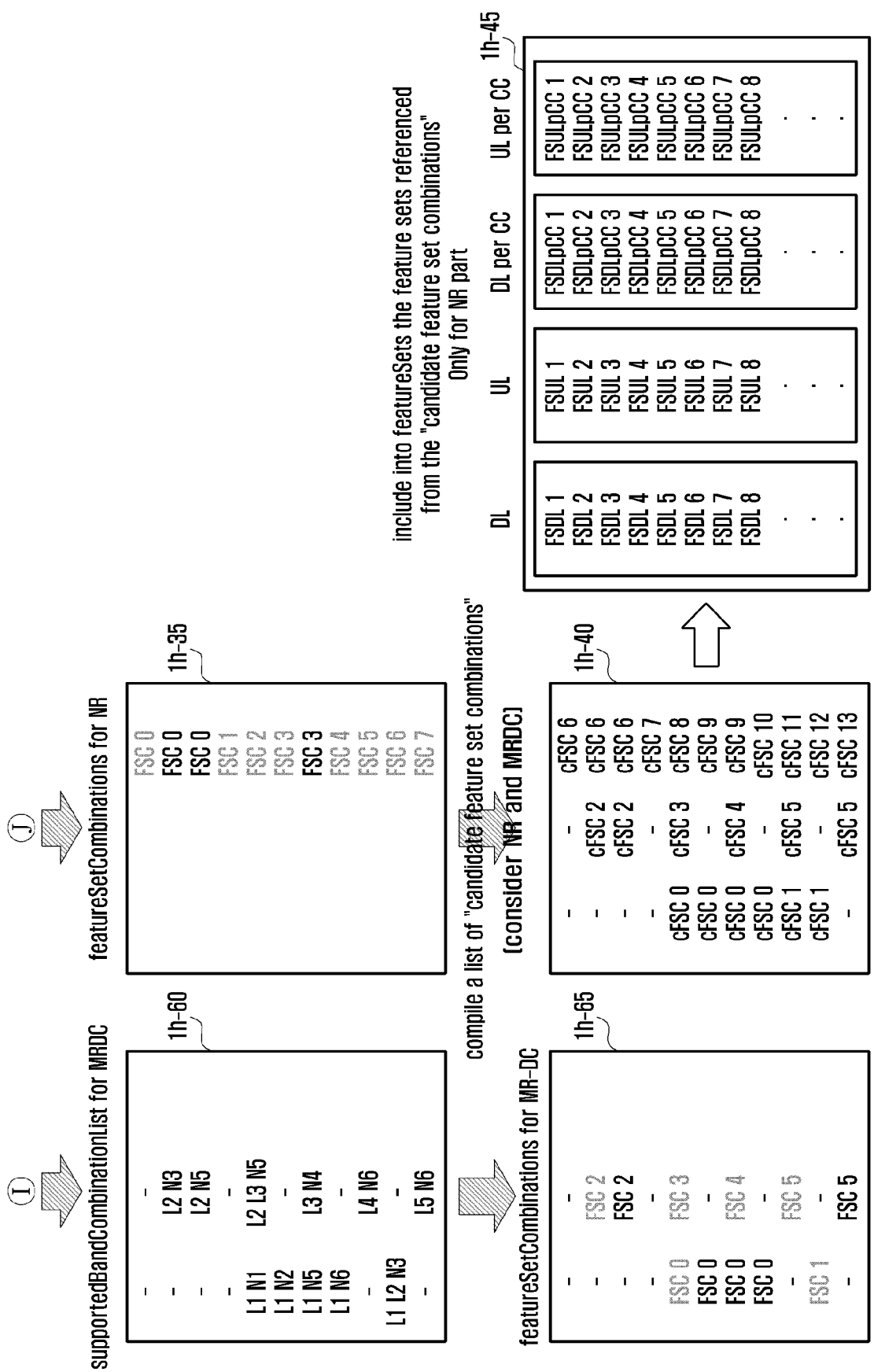
Figure 1I:
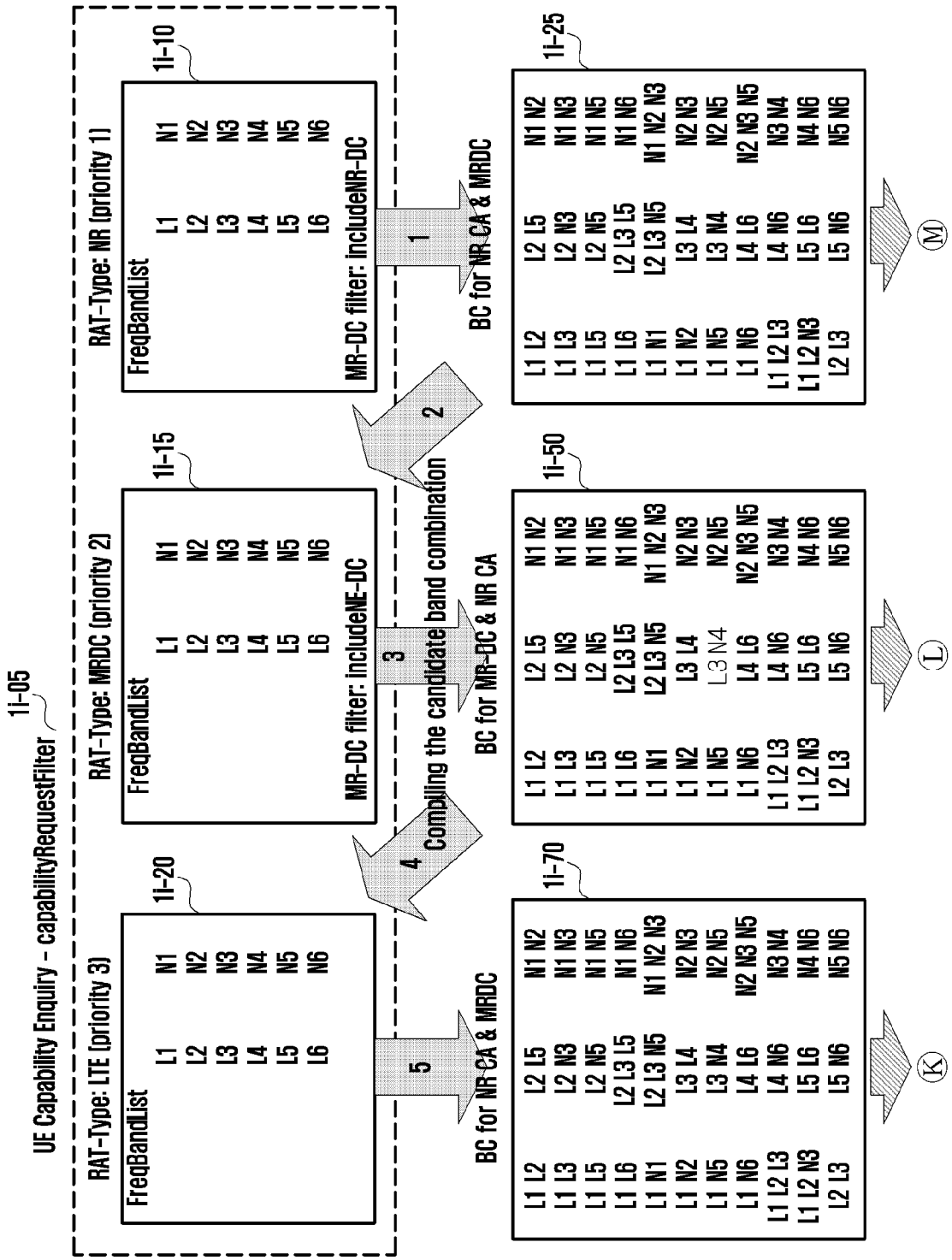
FIG. 1IA illustrates operations of configuring and of reporting a UE capability by a UE if a plurality of RAT types are requested via one UECapabilityEnquiry according to certain embodiments of this disclosure, FIG. 1IB illustrates an example of operations of configuring and reporting a UE capability by a UE if a plurality of RAT types are requested via one UECapabilityEnquiry according to certain embodiments of this disclosure, and FIG. 1IC illustrates operations of configuring and of reporting a UE capability by a UE if a plurality of RAT types are requested via one UECapabilityEnquiry according to certain embodiments of this disclosure.
Figure 1I:
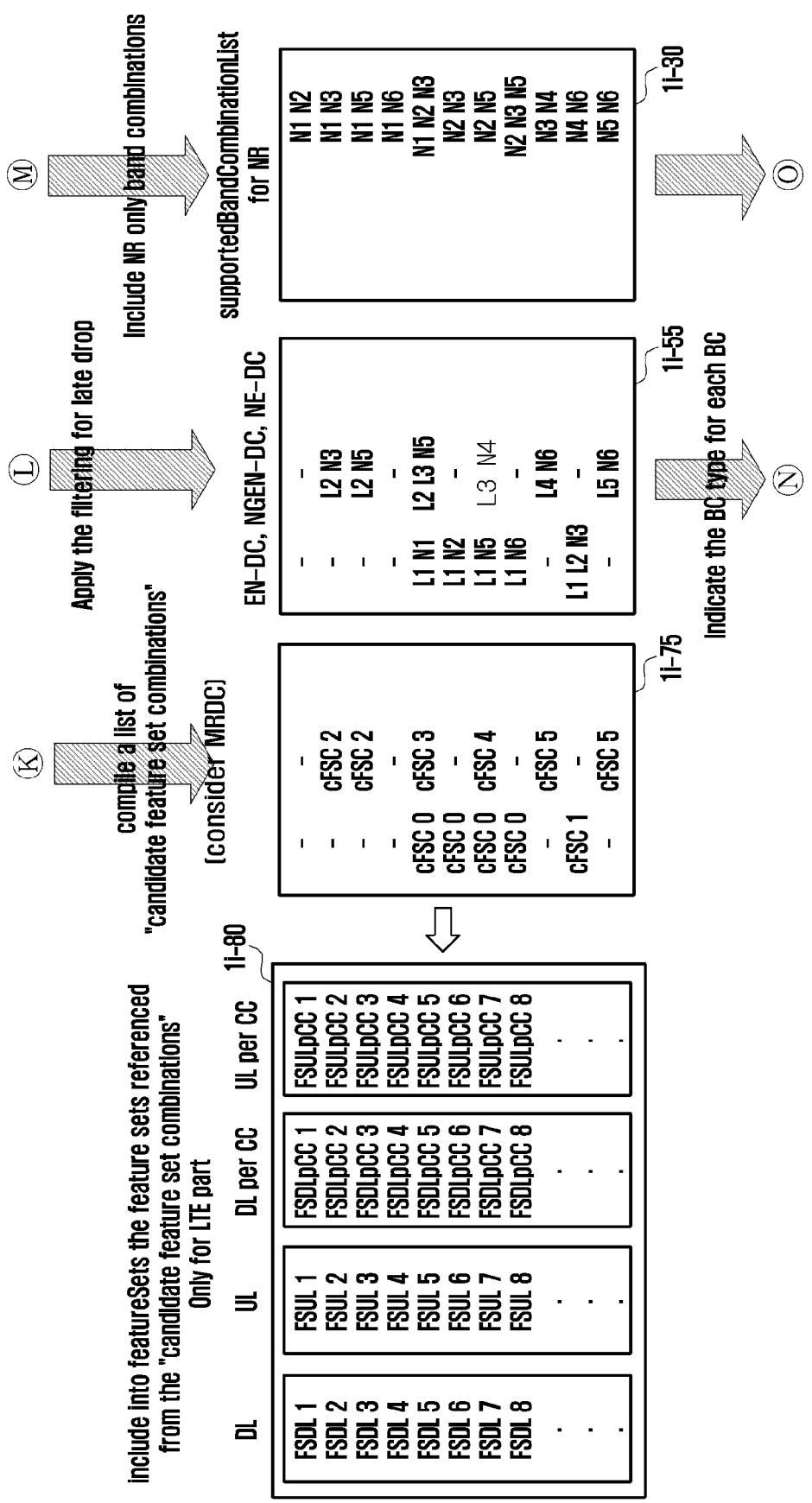
Figure 1I:
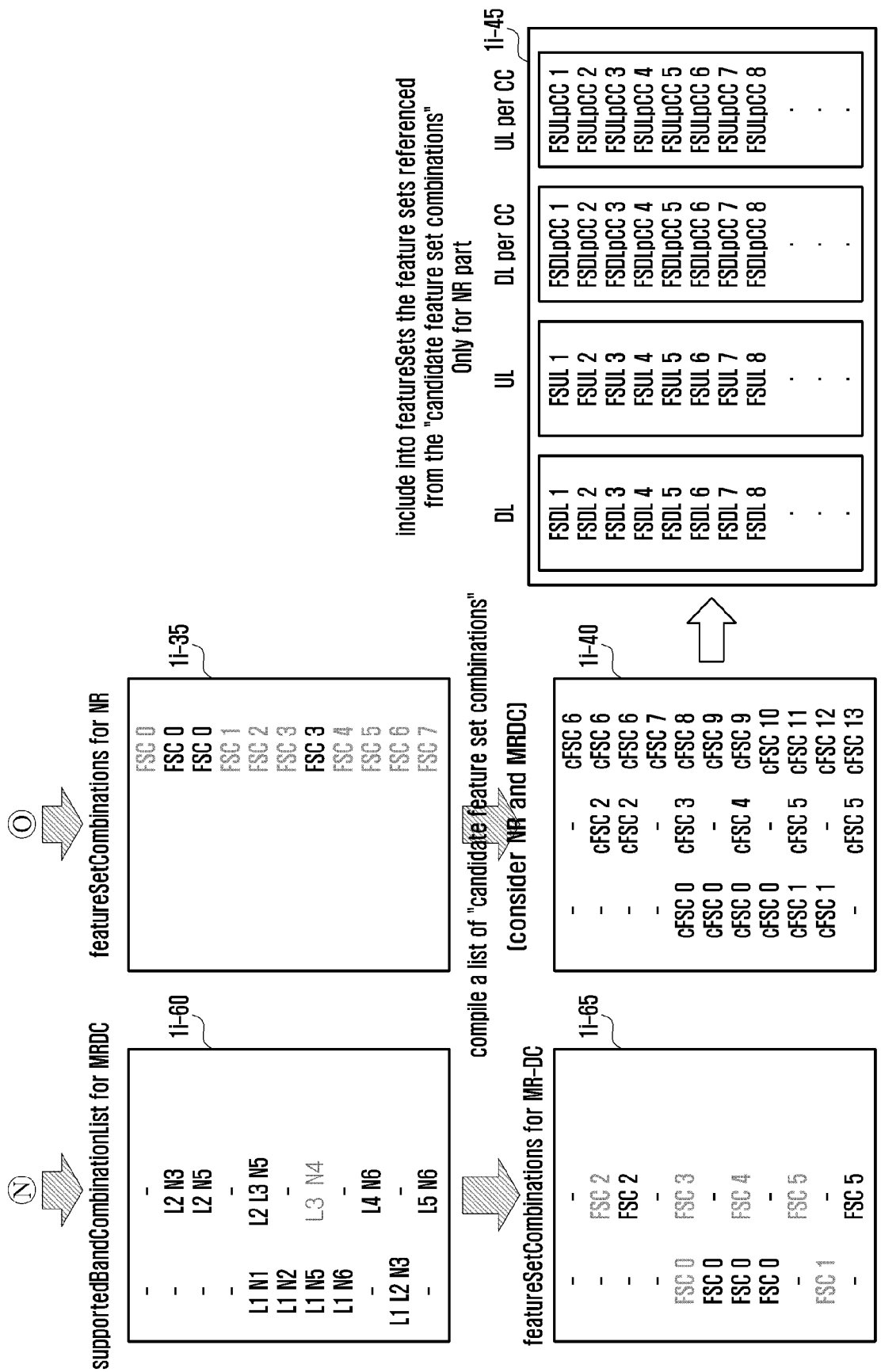
Figure 1J:
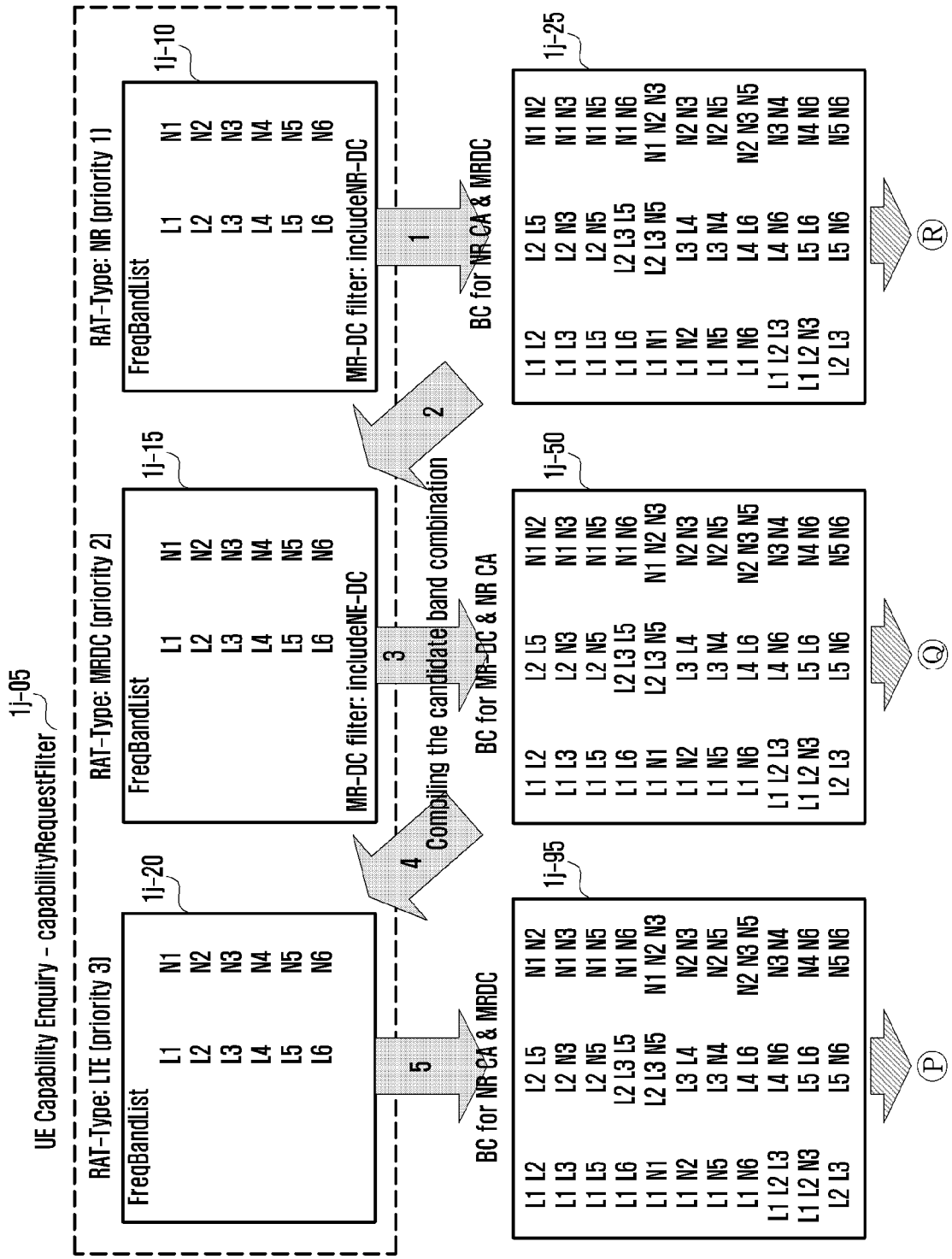
FIG. 1JA illustrates an example of configuring and of reporting a UE capability by a UE if a plurality of RAT types including UE capability for MR-DC are requested via one UECapabilityEnquiry according to various embodiments of this disclosure, FIG. 1JB illustrates an example of configuring and of reporting a UE capability by a UE if a plurality of RAT types including UE capability for MR-DC are requested via one UECapabilityEnquiry according to various embodiments of this disclosure, FIG. 1JC illustrates an example of configuring and of reporting a UE capability by a UE if a plurality of RAT types including UE capability for MR-DC are requested via one UECapabilityEnquiry according to various embodiments of this disclosure, and FIG. 1JD illustrates an example of configuring and of reporting a UE capability by a UE if a plurality of RAT types including UE capability for MR-DC are requested via one UECapabilityEnquiry according to various embodiments of this disclosure.
Figure 1J:
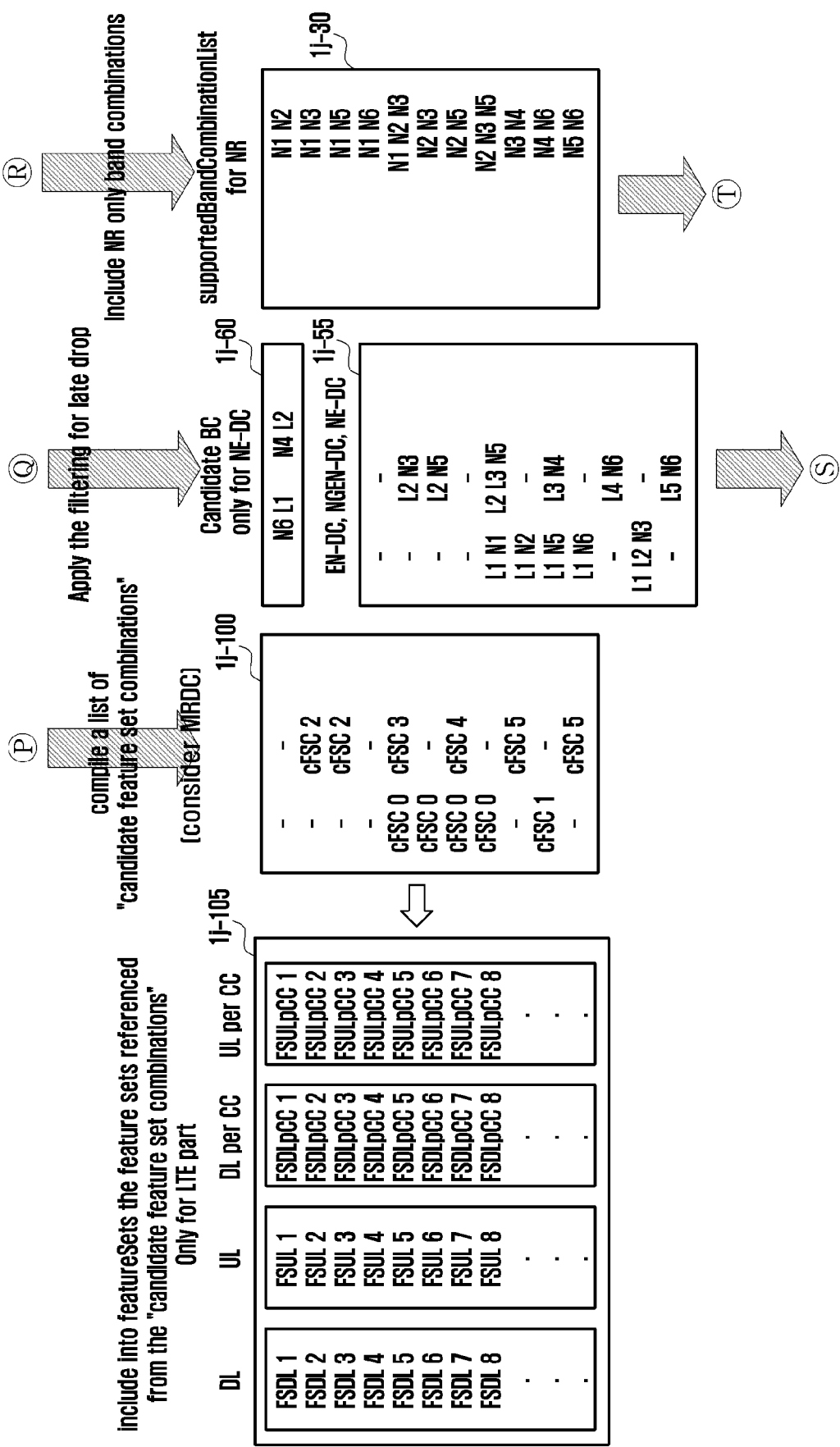
Figure 1J:
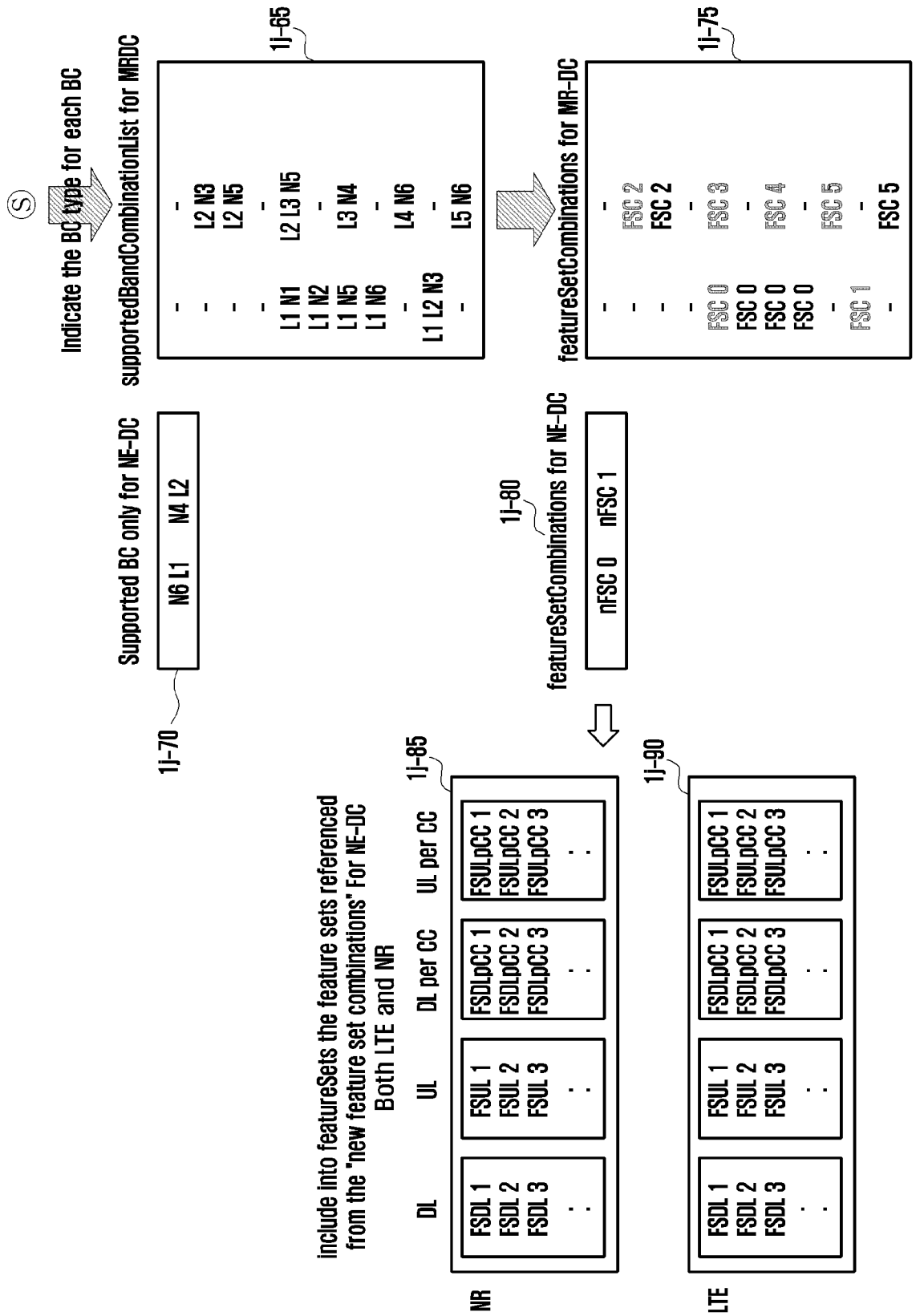
Figure 1J:
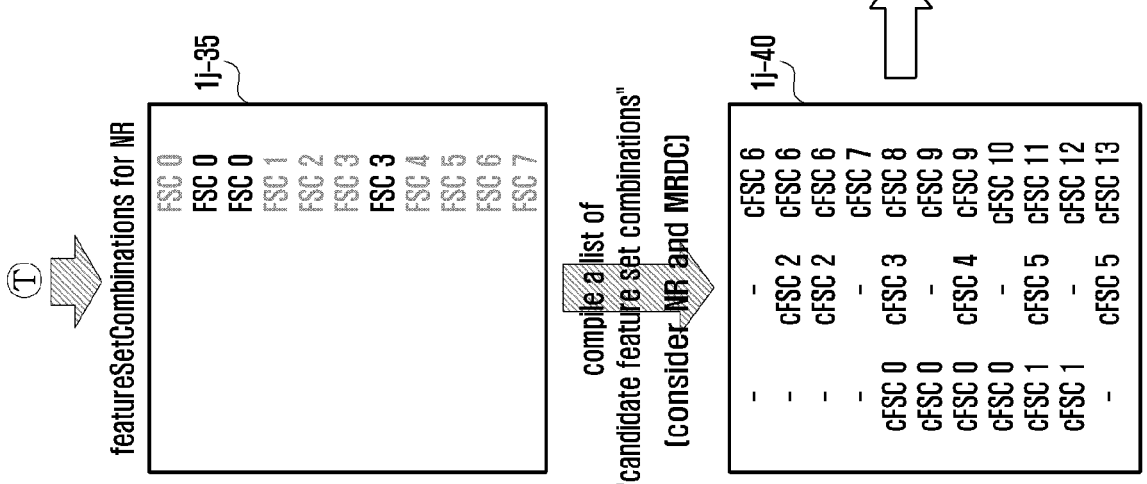
Figure 1K:
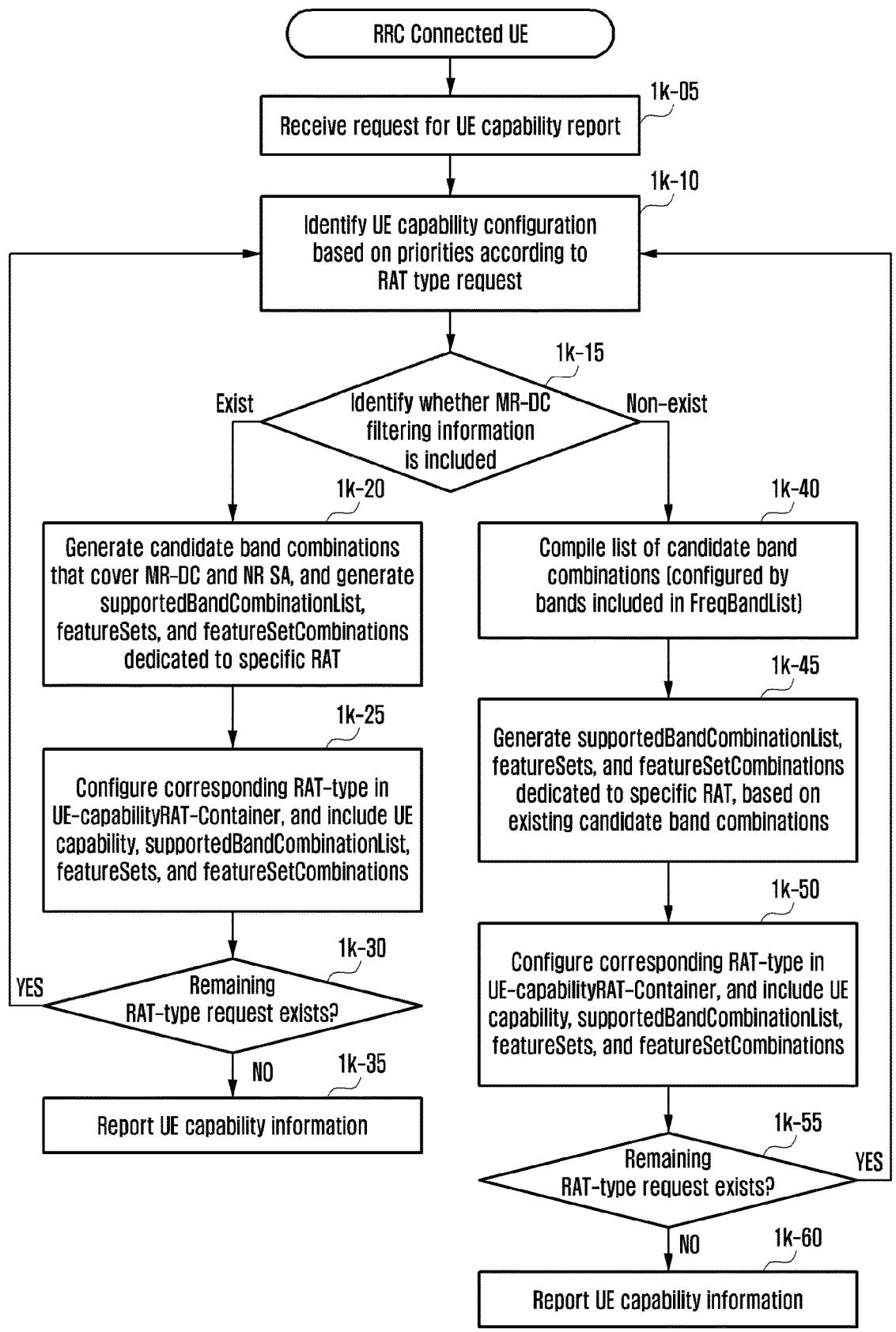
FIG. 1K illustrates an example of operations of a UE performing UE capability reporting on MR-DC according to various embodiments of this disclosure.
Figure 1L:
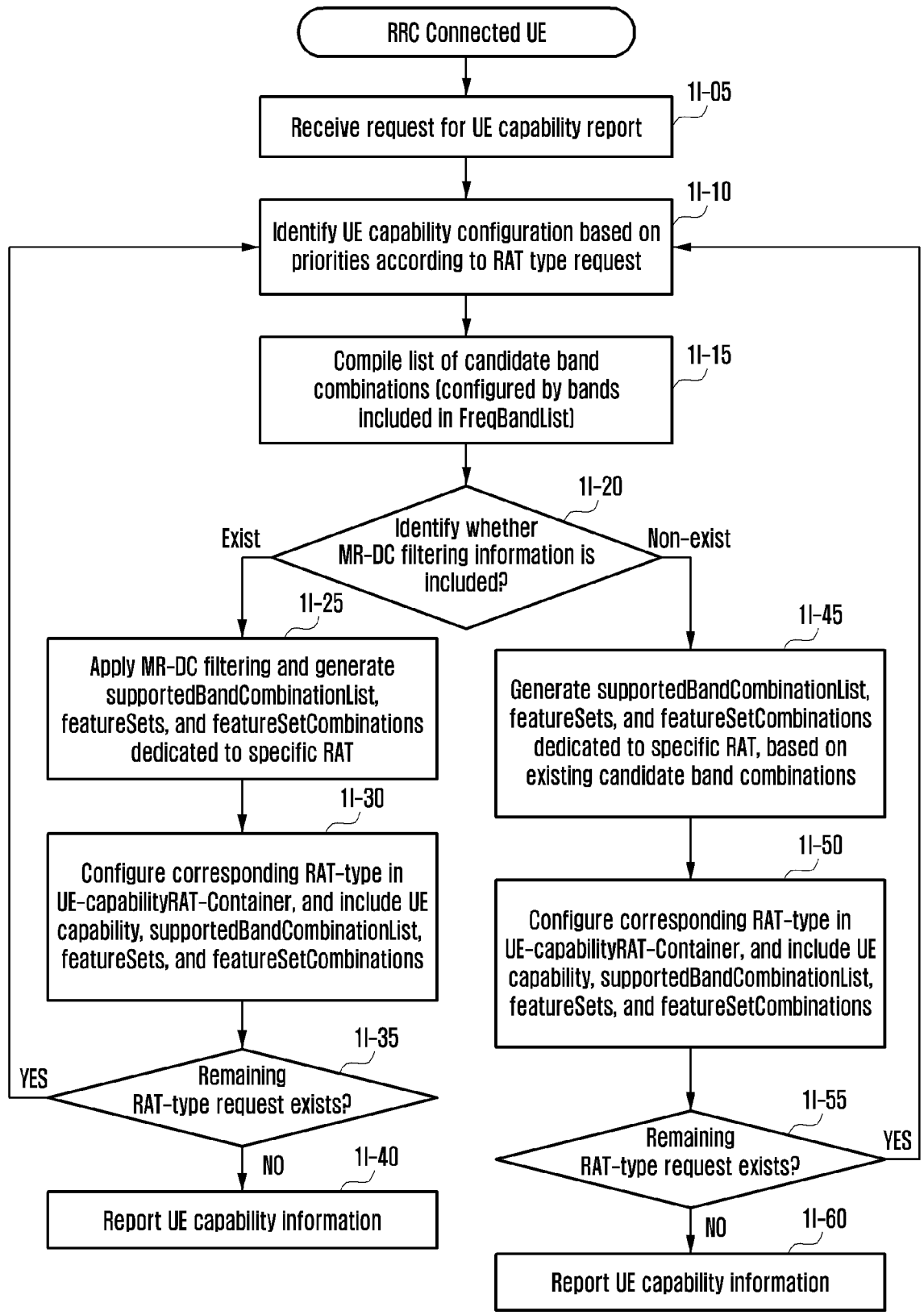
FIG. 1L an example of operations of a UE performing UE capability reporting on MR-DC, according to various embodiments of this disclosure.
Figure 1M:
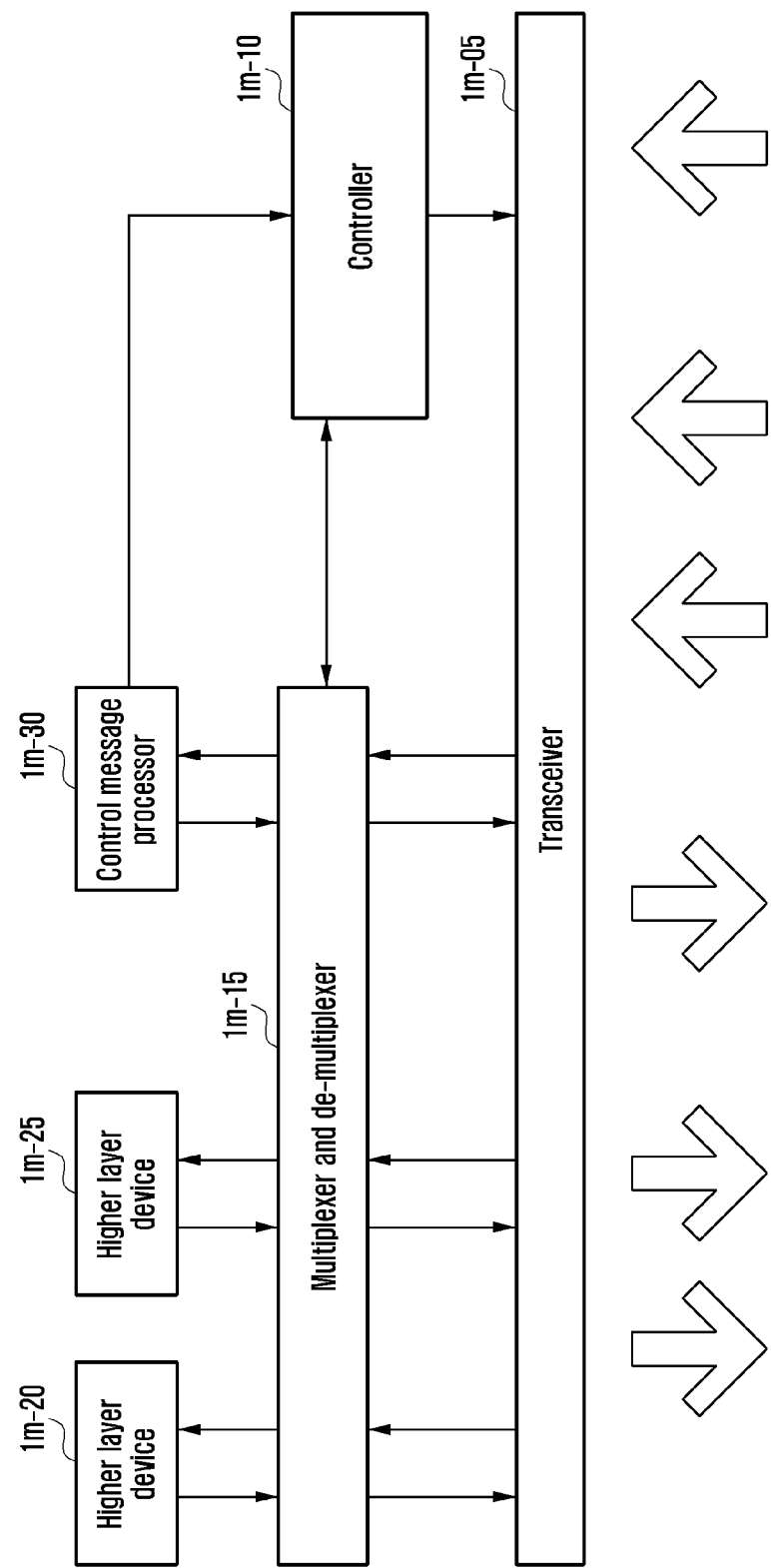
FIG. 1M illustrates, in block diagram format, an example of a UE according to at least one embodiment.
Figure 1N:
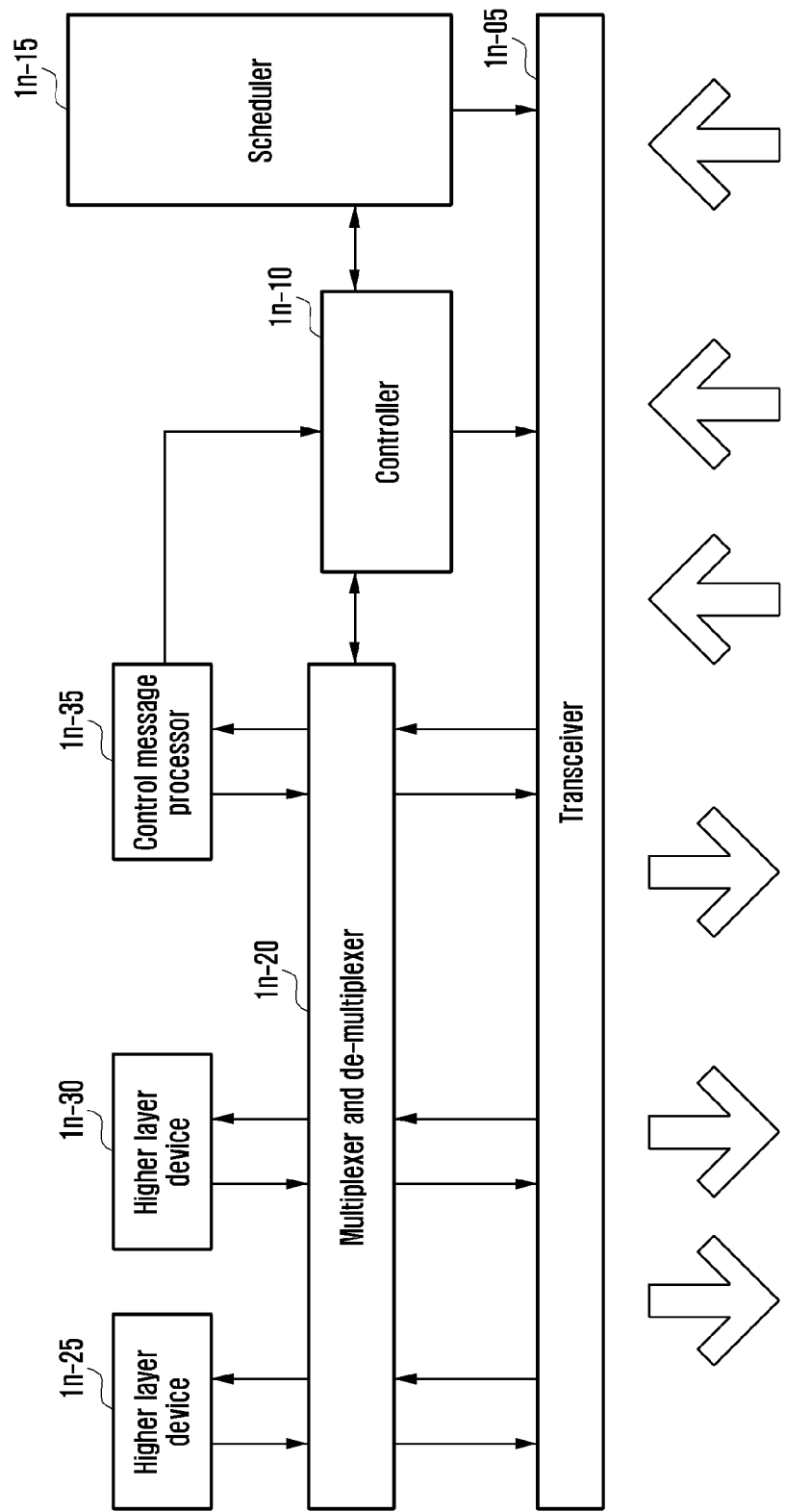
FIG. 1N illustrates, in block diagram format, an example of a base station according to certain embodiments of this disclosure.

FIGS. 1A through 1N, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principles of embodiments according to this disclosure will be described in detail in conjunction with the accompanying drawings. In the following description of the disclosure, a detailed description of known functions or configurations incorporated herein will be omitted if it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform to other standards.

FIG. 1A illustrates the structure of an example of LTE system according to various embodiments of this disclosure.

Referring to the non-limiting example of FIG. 1A, as shown, a radio access network of an LTE system includes a next-generation base station (evolved Node B, hereinafter referred to as eNB, Node B, or base station) 1a-05, 1a-10, 1a-15, and 1a-20, a mobility management entity (MIME) 1a-25, and a serving-gateway (S-GW) 1a-30. A user equipment (hereinafter referred to as UE or terminal) 1a-35 is connected to an external network through the eNBs 1a-05 to 1a-20 and the S-GW 1a-30.

Referring to the illustrative example of FIG. 1A, the eNBs 1a-05 to 1a-20 correspond to legacy Node Bs of a UMTS system. The eNB is connected to the UE 1a-35 through a radio channel and plays a more complicated role than the legacy Node B. In an LTE system, since all user traffic, including real-time services such as voice over IP (VoIP) over the Internet protocol, is serviced through a shared channel, there is a need for a device that performs scheduling by collecting state information, such as buffer states, available transmit power states, and channel state of UEs. The eNBs 1a-05 to 1a-20 may function as the device. In various embodiments, one eNB generally controls a plurality of cells. For example, in order to realize a transmission rate of 100 Mbps, the LTE system uses orthogonal frequency division multiplexing (hereinafter, referred to as OFDM) scheme in a 20 MHz bandwidth, as a radio access technology. In addition, an adaptive modulation & coding (hereinafter referred to as AMC) scheme that determines a modulation scheme and a channel coding rate according to the channel state of a UE is employed. The S-GW 1a-30 is a device for providing a data bearer, and generates or removes a data bearer under the control of the MME 1a-25. The MME is a device that is in charge of various control functions as well as a mobility management function for the UE and is connected to a plurality of base stations.

FIG. 1B illustrates an example of a radio protocol structure in an LTE system, according to various embodiments of this.

Referring to the non-limiting example of FIG. 1B, a radio protocol of an LTE system includes, for each of a UE and an eNB, packet data convergence protocols (PDCPs) 1b-05 and 1b-40, radio link controls (RLCs) 1b-10 and 1b-35, and medium access controls (MAC)s 1b-15 and 1b-30. PDCPs 1b-05 and 1b-40 are in charge of an operation such as IP header compression/reconstruction. The main functions of PDCP are summarized as follows.

Header compression and decompression: ROHC only

Transfer of user data

In-sequence delivery of higher layer PDUs at PDCP re-establishment procedure for RLC AM For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink According to certain embodiments, the radio link controls (hereinafter referred to as RLCs) 1b-10 and 1b-35 reconfigure a PDCP packet data unit (PDU) to an appropriate size to perform an ARQ operation. The main functions of RLCs are summarized as follows.

Transfer of higher layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 1b-15 and 1b-30 are connected to multiple RLC layer devices configured in one terminal, and may perform an operation of multiplexing RLC PDUs with an MAC PDU and demultiplexing the RLC PDUs from the MAC PDU. The main functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channel s Scheduling information reporting Error correction through HARQ Priority handling between logical channels of one UE Priority handling between UEs by means of dynamic scheduling MBMS service identification Transport format selection Padding Referring to the non-limiting example of FIG. 1B, physical layers 1b-20 and 1b-25 may perform an operation of channel coding and modulating higher layer data, generating the higher layer data into an OFDM symbol, transmitting the OFDM symbol through a radio channel, or demodulating an OFDM symbol received through a radio channel, channel-decoding the OFDM symbol, and transmitting the OFDM symbol to a higher layer. In addition, the physical layers use hybrid ARQ (HARQ) to perform additional error correction. The receiving terminal transmits a 1-bit signal for a condition as to whether to receive a packet transmitted from a transmitting terminal, which is called HARQ ACK/NACK information. Downlink HARQ ACK/NACK information with respect to uplink transmission is transmitted via a physical channel, which is a physical hybrid-ARQ indicator channel (PHICH). Uplink HARQ ACK/NACK information with respect to downlink transmission is transmitted via a physical channel, which is a physical uplink control channel (PUCCH) or physical uplink shared channel (PUSCH).

Meanwhile, the PHY layer may be configured by one or a plurality of frequencies/carriers and a technology of simultaneously configuring and using the plurality of frequencies is referred to as carrier aggregation (hereinafter, referred to as CA) technology. The CA technology is a technique in which, unlike a case where only one carrier is used for communication between a terminal (user equipment (UE)) and a base station (E-UTRAN NodeB (eNB)), a transmission amount may be dramatically increased as a multiple of the number of secondary carriers by additionally using a primary carrier and one or a plurality of secondary carriers. Meanwhile, in LTE, a cell in the base station using the primary carrier is called a primary cell (PCell) and a secondary carrier is called a secondary cell (SCell).

Although not illustrated in the drawings, a radio resource control (hereinafter, referred to as RRC) layer exists in a higher layer of the PDCP layer of each of the terminal and the base station, and the RRC layer may transmit or receive access and measurement-related configuration control messages for radio resource control.

FIG. 1C illustrates an example of the structure of a next generation mobile communication system according to various embodiments of this disclosure.

Referring to the non-limiting example of FIG. 1C, a radio access network of a next generation mobile communication system includes a next generation base station (new radio node B (hereinafter referred to as NR NB) 1c-10 and a new radio core network (NR CN) (or new generation core network (NG CN)) 1c-05. A user equipment (a new radio user equipment, hereinafter referred to as an NR UE or a terminal) 1c-15 accesses an external network via an NR NB 1c-10 and an NR CN 1c-05.

In the illustrative example of FIG. 1C, the NR NB 1c-10 corresponds to an evolved node B (eNB) of the legacy LTE system. The NR NB is connected to the NR UE 1c-15 via a radio channel and may provide a more excellent service as compared to the legacy node B. In the next generation mobile communication system, since all types of user traffics are serviced through a shared channel, there is a need for a device for performing scheduling by collecting state information, such as buffer states, available transmission power states, and channel states of UEs. Further, the NR NB 1C-10 is in charge of such a function of the device. One NR NB generally controls a plurality of cells. In order to implement ultra-high speed data transmission as compared to the legacy LTE, the NR NB may have the legacy maximum bandwidth or more, and may additionally employ beamforming technology using an orthogonal frequency division multiplexing (OFDM) as a radio access technology. In addition, the NR NB adopts an adaptive modulation & coding (hereinafter referred to as AMC) scheme that determines a modulation scheme and a channel coding rate based on the channel state of a UE. The NR CN 1c-05 performs functions, such as mobility support, bearer setup, and QoS setup. The NR CN is a device that is in charge of various control functions as well as a mobility management function for a UE, and is connected to a plurality of base stations. In addition, the next generation mobile communication system may further operate in conjunction with the legacy LTE system, and the NR CN is connected to an MME c-25 via a network interface. The MME is connected to an eNB 1c-30, that is, the legacy base station.

FIG. 1D illustrates an example of a radio protocol architecture of a next generation mobile communication system according to various embodiments of this disclosure.

Referring to the non-limiting example of FIG. 1D, the radio protocol of the next generation mobile communication system includes, for each of a UE and an NR base station, NR SDAPs 1d-01 and 1d-45, NR PDCPs 1d-05 and 1d-40, and NR RLCs 1d-10 and 1d-35, and NR MACs 1d-15 and 1d-30.

The main functions of the NR SPAPs 1d-01 and 1d-45 may, in some embodiments, include one or more of the following functions:
  Transfer of user plane data
  Mapping between a QoS flow and a DRB for both DL and UL
  Marking QoS flow ID in both DL and UL packets
  Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. If the SDAP header is configured, the UE is instructed by a one-bit NAS reflective QoS indicator (NAS reflective QoS) and a one-bit AS reflective QoS indicator (AS reflective QoS) of the SDAP header to update or reconfigure mapping information between a data bearer and a QoS flow of uplink and downlink. The SDAP header may include QoS flow ID information indicating QoS. The QoS information may be used as a data processing priority for supporting smooth services, scheduling information, or the like.

The function of the NR PDCPs 1d-05 and 1d-40 may, in various embodiments, include one or more of the following functions:
  Header compression and decompression: ROHC only
  Transfer of user data
  In-sequence delivery of higher layer PDUs
  Out-of-sequence delivery of higher layer PDUs
  PDCP PDU reordering for reception
  Duplicate detection of lower layer SDUs
  Retransmission of PDCP SDUs
  Ciphering and deciphering
  Timer-based SDU discard in uplink According to certain embodiments, a reordering function of the NR PDCP device refers to a function of sequentially reordering PDCP PDUs, received from a lower layer, based on a PDCP sequence number (SN), and may include a function of transmitting data to a higher layer in the sequence of reordering, a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The functions of the NR RLCs 1d-10 and 1d-35 may include one or more of the following functions:
  Transfer of higher layer PDUs
  In-sequence delivery of higher layer PDUs
  Out-of-sequence delivery of higher layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC device refers to a function of transmitting RLC SDUs, received from a lower layer, to a higher layer in the sequence of reception, and may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. Alternatively, if the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU, or sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. For segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In various embodiments according to this disclosure, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1d-15 and 1d-30 may be connected to multiple NR RLC layer devices configured in one UE, and functions of the NR MAC may include one or more of the following functions:
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The NR PHY layers 1d-20 and 1d-25 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

FIG. 1E illustrates an example of the structure of a message for reporting a UE capability in an NR system according to various embodiments of this disclosure. The non-limiting example of FIG. 1E illustrates certain embodiments in which a UE reports capability information based on a request of a base station.

In some embodiments, the UE 1e-01 performs a procedure of reporting a capability supportable by a UE to a corresponding base station while being connected to a serving base station 1e-02. In operation 1e-05, the base station transmits a UE capability enquiry message requesting a capability report to the UE which is in a connected state. The UE capability enquiry message from the base station may include a UE capability request for each RAT type. The request for each RAT type may include requested frequency band information according to priorities. Further, the UE capability enquiry message may make a request for a plurality of RAT types in one RRC message container, or multiple UE capability enquiry messages including a request for each RAT type may be transmitted to the UE. For example, in operation 1e-05, the UE capability enquiry may be repeated multiple times, and the UE may configure a UE capability information message corresponding to the repeated UE capability enquiry and match a response to the corresponding request to make a report. In the next generation telecommunication system, a UE capability request for NR, LTE, and MR-DC including EN-DC may be made. For reference, the UE capability enquiry message is in certain embodiments, transmitted initially after the UE establishes a connection. However, the UE capability enquiry message may be requested under any condition if the base station needs.

In the above operation, the UE, which has received a request for a UE capability report from the base station, configures a UE capability according to frequency band information and a RAT type, which are requested by the base station. A method for configuring a UE capability by a UE in the NR system, according to various embodiments of this disclosure, may be summarized as follows:

1. The UE may receive a request for some or all of RAT types in the LTE, EN-DC, and NR according to a UE capability request made by a base station, and lists of LTE and NR frequency bands may be provided at the same time. The UE configures a band combination (BC) of EN-DC and NR stand-alone (SA). For example, the UE configures a candidate BC list for EN-DC and NR SA, based on frequency bands requested, through FreqBandList, by the base station. The corresponding operation may be defined as an operation of compiling candidate band combinations. Further, the bands are prioritized in the order described in the FreqBandList. The operation may be performed once regardless of a RAT type or may be repeatedly performed for each RAT type.

In the following operations, the corresponding procedure is performed for each RAT type, and is preceded in order of NR, MR-DC, and LTE.

2. If the "eutra-nr-only" flag or the "eutra" flag is configured in the RAT type for a UE capability request message, matters relating to NR SA BCs among the compiled BC candidate list are completely removed. This may occur only if the LTE base station (eNB) requests "eutra" capability.

3. Thereafter, the UE removes fallback BCs from the candidate BC list compiled in the above operation. Here, the fallback BCs correspond to a case where a band corresponding to at least one SCell band is removed from a super set BC, and a fallback BC is omittable because the super set BC may already cover the fallback BC. This operation is further applied to EN-DC, i.e., LTE bands. The BCs remaining after performing this operation are included in the final "candidate BC list".

4. The UE selects BCs to be reported by selecting BCs suitable for the requested RAT type from the final "candidate BC list". In this operation, the UE compiles the supportedBandCombinationList in a predetermined order. For example, the UE compiles BCs and a UE capability to report according to a predetermined order of RAT type (nr->eutra-nr->eutra). Further, the UE compiles featureSetCombination for the complied supportedBandCombinationList and compiles a list of "candidate feature set combinations" from a candidate BC list from which a list of fallback BCs (including the same or lower level capabilities) has been removed. The above "candidate feature set combinations" include all of feature set combinations for NR and EUTRA-NA BC, and may be obtained from feature set combinations of containers of UE-NR-Capabilities and UE-MRDC-Capabilities.

5. Further, if the requested RAT type is EUTRA-NA and affects the supportedBandCombination of the corresponding EN-DC or MR-DC, featureSetCombinations is configured according to the corresponding RAT type, and is included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station in operations 1e-10. Thereafter, the base station performs suitable scheduling and transmission/reception management for the corresponding UE, based on the UE capability received from the UE.

FIG. 1F illustrates an example of an operation of reporting a UE capability by a UE if a plurality of RAT types are requested via one UECapabilityEnquiry, generally defined in a NR system, according to various embodiments of this disclosure. FIG. 1F provides a further example of UE capability reporting procedure and UE operation according to various embodiments of this disclosure.

Referring to the non-limiting example of FIG. 1F, the UE, which is in the RRC connected state, receives a request for a UE capability report from the base station in operation 1f-05. In operation 1f-05, the UE may receive, from a base station, a plurality of UE-CapabilityRAT-Requests via the UECapabilityEnquiry and a request for a report of one RAT type. If a plurality of UE-CapabilityRAT-Requests are transmitted via the UECapabilityEnquiry in operation 1f-05, the UE configures a UE capability based on the priorities according to a RAT type request in operation 1f-10. In NR, the UE may, in some embodiments, configure UE-CapabilityRAT-Containers based on the following priorities.

UE-CapabilityRAT-Container for NR;
UE-CapabilityRAT-Container for EUTRA-NR;
UE-CapabilityRAT-Container for EUTRA;

The EUTRA-NA container includes EN-DC, but later may include NGEN-DC and NE-DC, which are late drop issues. For reference, NR-DC may be included in an NR container and transmitted.

According to a request for a UE capability report relating to a specific RAT type in operation 1f-10, the UE compiles candidate band combinations according to frequency filtering information (FreqBandList) first included in the RAT type container in operation 1f-15. That is, UE operations in the above operation and subsequent UE operations can be performed for a specific RAT type. For reference, the FreqBandList information has consistency for a case where RAT types of EN-DC, NR SA, and LTE are requested together, and thus the corresponding procedure is performed for each RAT type to have a result obtained by repeating the same procedure for each RAT type. In operation 1f-20, the UE performs filtering of the candidate band combinations obtained for each RAT type and generates final candidate band combination applied to the corresponding RAT type. The filtering operation applied to operation 1f-20 may correspond to procedures 2 to 3 described with reference to FIG. 1E. See below.

If the "eutra-nr-only" flag or the "eutra" flag has been configured, matters relating to NR SA BCs among the compiled BC candidate list are completely removed. The removal may occur only if the LTE base station (eNB) requests the "eutra" capability.

Thereafter, the UE removes fallback BCs from the candidate BC list configured in the above operation. Here, the fallback BC corresponds to a case where a band corresponding to at least one SCell band is removed from a super set BC, and the fallback BC is omittable since the super set BC may already cover the fallback BC. This operation is further applied to EN-DC, i.e., LTE bands. The BCs remaining after performing this operation are included in the final "candidate BC list".

In operation 1f-25, the UE selects BCs to be reported by selecting, from the final "candidate BC list", BCs suitable for a requested RAT type. In this operation, the UE compiles supportedBandCombinationList in a predetermined order. In addition, the UE compiles featureSetCombination for the supportedBandCombinationList generated in the above procedure, and compiles a list of "candidate feature set combinations" from the candidate BC list from which the list of fallback BCs (including the same or lower level capabilities) has been removed. The "candidate feature set combinations" include all of feature set combinations for the NR and the EUTRA-NA BC, and may be obtained from feature set combinations of containers of UE-NR-Capabilities and UE-MRDC-Capabilities. The procedure of generating the featureset is performed only in the NR and EUTRA RAT type, and the corresponding operation of the procedure is not performed in the EUTRA-NA RAT type. This is because the featureset for an NR part of the EN-DC is transmitted to the NR container, and the featureset for an LTE part of the EN-DC is transmitted to the LTE container, and thus redundant signaling is not necessary. In addition, although description has been made only for the NR RAT type in the above, the UE may perform a procedure of generating candidate featureset combinations and an LTE part featureset of EN-DC, for the LTE RAT type. In operation 1f-30, if the EUTRA-NA RAT type is requested and affects the supportedBandCombination of EN-DC, the featureSetCombinations are included in both containers of UE-MRDC-Capabilities and UE-NR-Capabilities. However, the feature set of NR is included only in the UE-NR-Capabilities.

In operation 1f-35, the UE identifies whether there is a RAT-type request remaining in the UE-CapabilityRAT-Request, requested via the UECapabilityEnquiry from the base station, and if there is a RAT-type, which has a lower priority than a previous RAT-type and has not been processed, the UE performs a procedure for the corresponding RAT type, starting from operation 1f-15. If there is no RAT type remaining in the UE-CapabilityRAT-Request in operations 1f-35, the UE transmits the UE capability message (information), which has been stored according to a RAT type, to the base station in operation 1f-35.

FIG. 1GA illustrates operations of reporting a UE capability by a UE, if a plurality of RAT types are requested via one UECapabilityEnquiry, generally defined in a NR system, according to certain embodiments of this disclosure. FIG. 1GB illustrates an example of reporting a UE capability by a UE, if a plurality of RAT types are requested via one UECapabilityEnquiry, defined in a current NR system according to certain embodiments. For example, all the operations of the UE described above with reference to FIG. 1F are illustrated through actual examples.

Referring to the non-limiting examples of FIGS. 1GA and 1GB, the base station may request a UE capability by including a request for each of NR 1g-10, MR-DC 1g-15, and LTE 1g-20 in a RAT type for a UE capability enquiry message 1g-05. Further, the base station includes, in the UE capability enquiry message 1g-05 FreqBandList for each corresponding RAT type as filtering information for UE capability reporting. For reference, the FreqBandList information has consistency for a case where the EN-DC and the NR SA are requested together. Meanwhile, each RAT type includes independent corresponding FreqBandList information. However, by maintaining the same information (frequency list) in the RAT type, the index of the feature set reported by the UE is maintained the same in the cases of EN-DC and NR SA, and thus the generality of UE reporting can be achieved. If FreqBandList information is different for each RAT type, particularly different for the EN-DC and the NR SA, supported band combination, feature set, and feature set combinations are to be configured according to a RAT type. Accordingly, if the same feature set is indicated by the EN-DC and the NR SA, a problem of using different feature set indices or being incompatible with each other may occur. In the explanatory examples of FIGS. 1GA and 1GB, LTE frequencies (L1, L2, L3, L4, L5, and L6) and NR frequencies (N1, LN, N3, N4, N5, and N6) are assumed to be included in FreqBandList in a situation where all of NR, EN-DC, and LTE are requested. The frequency order indicates priorities, and in this embodiment, the priorities are arranged in the order of L1, L2, L3, L4, L5, L6, N1, LN, N3, N4, N5, and N6. As described above, in some embodiments, FreqBandList includes the same information for all RAT types for which UE capability is requested.

The UE performs an operation of generating UE capability among the NR, EN-DC, and LTE in order of the priorities according to a predetermined procedure. For example, the UE first generates candidate band combinations by making reference to FreqBandList for NR. Here, all candidate band combinations supporting NR SA and EN-DC are selected as the candidate band combinations in operation 1g-25. Thereafter, in operation 1g-30, the UE performs filtering of NR, which is the corresponding RAT type, among the selected candidate band combinations and compiles a supportedBandCombinationList including only band combinations supported by NR band. In operation 1g-35, the UE may generate a featureset combination associated with the supportedBandCombinationList and may generate and configure featuresets that may be included in the featureset combination. As illustrated with reference to operations 1g-30 and 1g-35, featureset combinations and BCs in the supportedBandCombinationList are not always mapped 1:1 to each other, and the featureset combination may be configured to be mapped to multiple BCs. This is because not all BCs are configured with different UE capabilities, and even though BCs are different, UE capabilities in the corresponding BCs are the same in many cases. As shown in operation 1g-40, the UE makes reference to the final candidate band combination list and configures a list of "candidate feature set combinations" related thereto. The "candidate feature set combinations" include all of feature set combinations for the NR and the EN-DC BC, and can be obtained from feature set combinations of containers of the UE-NR-Capabilities and the UE-MRDC-Capabilities. Thereafter, the UE generates a featureset configuring the candidate feature set combinations, which includes featuresetDL, featuresetUL, featuresetDLPerCC, featuresetULPerCC, and the like. The above procedure is performed only in the RAT type for NR and EUTRA, and the corresponding operation of the procedure is not performed in the RAT type for EUTRA-NR. This is, in some embodiments, because the featureset for an NR part of the EN-DC is transmitted to the NR container, and the featureset for an LTE part of the EN-DC is transmitted to the LTE container, and thus redundant signaling is not necessary. The supportedBandCombinationList, featureSetCombination, and featureSets, which are obtained in the above operation, may be included in the NR container (UE-NR-Capabilities).

Thereafter, as shown in operation 1g-50, the UE re-identifies FreqBandList for EN-DC according to the pre-defined priority, and generates candidate band combinations for EN-DC. Here, all candidate band combinations supporting NR SA and MR-DC are selected as the candidate band combinations. Thereafter, in operation 1g-55, the UE performs filtering of the corresponding RAT type EN-DC among the selected candidate band combinations, and generates/compiles a supportedBandCombinationList including only band combinations supported by the EN-DC band. As shown in operation 1g-60, the UE generates feature set combinations applied to the supportedBandCombinationList summarized above, and writes a corresponding ID in each supportedBandCombinationList. The information generated above is stored in the EN-DC UE capability container.

Referring to the non-limiting example of FIGS. 1GA and 1GB, in operation 1g-65, the UE re-identifies FreqBandList for LTE according to the predefined priority and generates candidate band combinations for LTE. Here, all candidate band combinations supporting NR SA and EN-DC are selected as the candidate band combinations. Thereafter, as shown in operation 1g-70, the UE performs filtering of the corresponding RAT type LTE, for example, EN-DC BC, among the selected candidate band combinations, and generates feature sets and feature set combinations, applied to the band combinations supported by the LTE band, in operation 1g-75. The generated information is stored in the LTE UE capability container. In the above operation, since, in LTE, LTE standalone BC, that is, BC information relating to LTE CA is not included and only BC information of EN DC is included, the supportedBandCombinationList is not added separately. For example, the supportedBandCombinationList is already included in the EN-DC container.

FIGS. 1GA and 1GB illustrate an example of a UE capability reporting procedure in an NR system that supports an NR standalone (SA) mode and a non-standalone (NSA) mode, and particularly supports EN-DC. However, in certain embodiments, the previous operation does not include a UE capability reporting procedure for NGEN-DC, NE-DC, and NR-DC, which are late drop issues, and thus it is necessary to clarify the operation. In some embodiments, the base station may configure, in a UE Capability enquiry message, filtering information about EN-DC, NGEN-DC, NE-DC, NR-DC, etc., which are for defining an MR-DC configuration in capabilityRequestFilter information, and transmit the same to the base station. In the above, since filtering associated with the EN-DC may not request EN-DC BC information, the EN-DC BC information may be requested. In addition, since NGEN-DC and NE-DC can be configured by a combination of LTE and NR bands, like EN-DC, the corresponding information may be processed and stored together in a container for processing MR-DC and transmitted to the base station. In addition, the NR-DC may be processed together with the NR CA in the NR container. As a result, the main content of the disclosure is to clarify a procedure in which the base station requests a UE capability related to MR-DC from the UE. In the disclosure, MR-DC is a term generally referring to EN-DC and NGEN-DC, NE-DC, and NR-DC, and may be used to include EN-DC, NGEN-DC, and NE-DC in some of examples.

The disclosure considers, without limitation, a case of whether BCs, for which NE-DC or NGEN-DC is supported by the UE, in the MR-DC (especially, a case of including EN-DC, NGEN-DC, and NE-DC), may occur as new additional BCs in addition to BCs supported in the EN-DC. For example, the following two situations may occur.

1. Case 1: BC information associated with EN-DC supported by a UE includes always BCs supporting NE-DC or NGEN-DC. For example, BCs supporting NE-DC or NGEN-DC are configured by a subset of BCs supporting EN-DC.
2. Case 2: In addition to BC information associated with EN-DC supported by the UE, a specific BC supporting NE-DC or NGEN-DC is not included in supported BC list for EN-DC. For example, a specific BC in the supported BC list for NE-DC or NGEN-DC may be a separate BC that is not included in the subset of BCs supporting EN-DC.

Both cases may occur depending on a method in which actual UE capability is determined. Generally, it may be necessary to define a UE operation under an assumption of "case 2". This is because satisfying "case 2" may mean that the UE operation is defined to satisfy "case 1" at all times. However, if case 1 is always satisfied, it may be useful in view of not significantly changing the general UE capability reporting procedure defined for the EN-DC.

In the following embodiment, a procedure of reporting MR-DC UE capability is defined in consideration of the above two cases.

FIG. 1HA illustrates an example of a procedure of configuring a UE capability proposed in embodiment 1, and illustrates an operation of reporting a UE capability by a UE if a plurality of RAT types including a UE capability request for MR-DC are requested via one UECapabilityEnquiry FIG. 1HB illustrates an example of a procedure of configuring a UE capability proposed in embodiment 1, and illustrates an operation of reporting a UE capability by a UE if a plurality of RAT types including a UE capability request for MR-DC are requested via one UECapabilityEnquiry. Referring to the non-limiting examples of FIGS. 1HA and 1HB, Embodiment 1 describes a situation to which "case 1" described above is applied. In addition, since the embodiment focuses on a UE capability request procedure for the MR-DC, the description of NR RAT type is not different from the procedure described in FIGS. 1GA and 1GB. For reference, FIGS. 1GA and 1GB describe a request for EN-DC not a request for MR-DC.

The base station may request a UE capability by including a request for each of NR 1h-10, MR-DC 1h-15, and LTE 1h-20 in the RAT type for a UE capability enquiry message 1h-05, and each RAT type includes FreqBandList as filtering information for UE capability reporting. For reference, the FreqBandList information has consistency for a case where the MR-DC and the NR SA are requested together. Meanwhile, each RAT type includes independent corresponding FreqBandList information. However, by maintaining the same information (frequency list) in the RAT type, the index of the feature set reported by the UE is maintained the same in the cases of MR-DC and NR SA, and thus the generality of UE reporting can be achieved. If FreqBandList information is different for each RAT type, and particularly, is different for the MR-DC and the NR SA, supported band combination, feature set, and feature set combinations are configured according to a RAT type. Accordingly, if the same feature set is indicated by the MR-DC and the NR SA, a problem of using different feature set indices or being incompatible with each other may occur. In FIGS. 1HA and 1HB, LTE frequencies (L1, L2, L3, L4, L5, and L6) and NR frequencies (N1, LN, N3, N4, N5, and N6) have been assumed to be included in the FreqBandList in a situation where all of NR, MR-DC, and LTE are requested. The frequency order indicates priorities, and in this embodiment, the priorities are arranged in the order of L1, L2, L3, L4, L5, L6, N1, LN, N3, N4, N5, and N6. As described above, the FreqBandList includes the same information for all RAT types for which UE capability is requested.

According to certain embodiments, the UE performs an operation of generating a UE capability among the NR, MR-DC, and LTE in order of the priorities according to a predetermined procedure. For example, the UE first generates candidate band combinations by making reference to FreqBandList for NR. Here, all candidate band combinations supporting NR SA and MR-DC are selected as the candidate band combinations in operation 1h-25. In operation 1h-25, the selection of all candidate band combinations supporting MR-DC has the same result as that of the selection of all candidate band combinations supporting EN-DC. This is because, in some embodiments, embodiment 1 considers "case 1". Thereafter, in operation 1h-30, the UE performs filtering of NR, which is the corresponding RAT type, among the selected candidate band combinations and compiles a supportedBandCombinationList including only band combinations supported by an NR band. In operation 1h-35, the UE may generate a featureset combination associated with the supportedBandCombinationList and may generate and configure featuresets that may be included in the featureset combination. As can be identified in operations 1h-30 and 1h-35, featureset combinations and BCs in the supportedBandCombinationList are not always mapped 1:1 to each other, and the featureset combination may be configured to be mapped to multiple BCs. This is because not all BCs are configured with different UE capabilities, but even though the BCs are different, UE capabilities in the corresponding BCs are the same in many cases. In operation 1h-40, the UE makes reference to the final candidate band combination list and configures a list of "candidate feature set combinations" related thereto. The "candidate feature set combinations" include all of feature set combinations for NR and MR-DC BC, and can be obtained from feature set combinations of containers of the UE-NR-Capabilities and the UE-MRDC-Capabilities. Thereafter, the UE generates a featureset configuring the candidate feature set combinations, which includes featuresetDL, featuresetUL, featuresetDLPerCC, featuresetULPerCC, and the like. In certain embodiments, the above procedure is performed only in the RAT type for NR and EUTRA, and the corresponding operation of the procedure is not performed in the RAT type for EUTRA-NR. This is because the featureset for an NR part of the MR-DC is transmitted to the NR container, and the featureset for an LTE part of the MR-DC is transmitted to the LTE container, and thus redundant signaling is not necessary. The supportedBandCombinationList, featureSetCombination, and featureSets, which are obtained in the above operation, may be included in the NR container (UE-NR-Capabilities).

Thereafter, as shown in operation 1h-50, the UE re-identifies FreqBandList for MR-DC according to the defined priority and generates candidate band combinations for MR-DC. Here, all candidate band combinations supporting NR SA and MR-DC are selected as the candidate band combinations. If it is clearly defined, a procedure of generating candidate band combinations in operation 1h-50 has the same result as the case of generating BCs supporting EN-DC. In addition, in a procedure, since "case 1" is considered, generating of candidate band combinations for EN-DC BC can be performed. Thereafter, as shown in operation 1h-55, the UE performs a filtering procedure for a RAT type that needs to be actually reported for the selected candidate band combinations. In operation 1h-55, filtering information applicable to the UE by the base station is as follows.

Omit EN-DC: A filter for excluding BCs associated with EN-DC from the generated candidate band combinations Include (or omit) NGEN-DC: A filter for adding or excluding BCs associated with NGEN-DC to or from the generated candidate band combinations Include (or omit) NE-DC: A filter for adding or excluding BCs associated with NE-DC to or from the generated candidate band combinations For reference, "Include (or omit) NR-DC" may be configured, but the corresponding filtering may be applied in the NR container without being considered in the MR-DC container. In addition, an include or an omit filter may be applied, and the following UE operation can be obtained.

If no IncludeNE-DC filter is included, BCs associated with NE-DC are removed from candidate band combinations If the OmitNE-DC filter is included, BCs associated with NE-DC are removed from the candidate band combinations As described above, all of MR-DC filtering methods can be unified using a consistent Omit filtering method. In this case, the UE operation can be consistently defined.

Further, in some embodiments, there is a need for a base station operation of determining whether the omitEN-DC filter can be used alone. For example, the base station operation includes a case where, if the base station requests UE capability for MR-DC, only the omitEN-DC filter is included as filtering information. In the embodiment, if filtering is applied to omitEN-DC, none of the supportedBandCombinationList and feature set combinations transmitted through the MR-DC container actually exist. In addition, a Rel-15 initial UE (for example, a UE that cannot interpret the omitEN-DC) stores and transmits a UE capability for EN-DC BC to the MR-DC container (without applying filtering thereto) according to the existing procedure. In other words, the UE generates and transmits supportedBandCombinationList and feature set combinations for EN-DC. However, a Rel-15 late-drop UE (that is, a UE that has interpreted omitEN-DC) transfers an empty container to the base station without carrying any information in the MR-DC container. If the Rel-15 initial UE and the late-drop support UE request different operations described above, the base station may configure the omitEN-DC filter alone and transmit the same simultaneously at the request of the MR-DC UE capability. Alternatively, if the above operation is not defined as intended, an operation of forcing the base station not to perform configuring omitEN-DC filter alone and transmitting the same simultaneously at the request of the MR-DC UE capability is required. This is because, in some embodiments, the forcing operation has the same effect as that of not making a UE capability request for the MR-DC.

As shown in operation 1h-60, especially for the final candidate band combination having been subjected to filtering of the MR-DC, the UE transfers corresponding bands, a BC except for the fallback BC, to the supportedBandCombinationList for the MR-DC. In addition, if the MR-DC BC is stored in the supportedBandCombinationList, the UE may check which MR-DC the corresponding BC supports. For example, the following four supports can be checked.
EN-DC support
NGEN-DC support
NE-DC support
NR-DC support (which is checked in the supportedBand-CombinationList transferred to NR UE capability container)

For example, it may indicate which MR-DC a BC existing in a specific supportedBandCombinationList can support and a plurality of RAT types can be indicated at the same time.

Referring to the non-limiting examples of FIGS. 1HA and 1HB, at operation 1h-65, the UE generates feature set combinations applied to the supportedBandCombinationList summarized above, and writes a corresponding ID in each supportedBandCombinationList. The information generated above is stored in the MR-DC UE capability container.

As shown in operation 1h-70, the UE re-identifies FreqBandList for LTE according to the predefined priority and generates candidate band combinations for LTE. Here, all candidate band combinations supporting NR SA and MR-DC are selected as the candidate band combinations (Alternatively, it may be interpreted as a band supporting EN-DC instead of MR-DC). The UE performs filtering of the corresponding RAT type for LTE, for example, filtering of the MR-DC BC, among the selected candidate band combinations in operation 1h-75, and generates feature sets and feature set combinations, applied to the band combinations supported by the LTE band, in operation 1h-80. The generated information is stored in the LTE UE capability container. In the above operation, since, in LTE, LTE standalone BC, that is, BC information relating to LTE CA is not included, but only BC information relating to MR-DC is included, supportedBandCombinationList is not added separately. For example, the supportedBandCombinationList is already included in the MR-DC container.

FIG. 1IA illustrates an example of a procedure of configuring a UE capability, for example, such as proposed in embodiment 2, and illustrates an operation of UE capability reporting by a UE if a plurality of RAT types including a UE capability for MR-DC are requested via one UECapabilityEnquiry, according to certain embodiments of this disclosure. FIG. 1IB illustrates an example of a procedure of configuring a UE capability, for example, such as proposed in in embodiment 2, and illustrates an operation of UE capability reporting by a UE if a plurality of RAT types including UE capability for MR-DC are requested via one UECapabilityEnquiry. Embodiment 2 describes a situation to which "case 2" described above is applied. In addition, since the embodiment focuses on the UE capability request procedure for the MR-DC, the description of the NR RAT type is not different from the procedure described in FIGS. 1GA and 1GB. For reference, FIGS. 1GA and 1GB are summarized as the request for EN-DC not the request for MR-DC. A feature of certain embodiments as described below is that NE-DC BC (or NGEN-DC BC), unlike EN-DC BC, is expressed as a separate BC, and the main subject matter of the disclosure is, which information is to be used for generating candidate band combinations by the UE. In other words, in certain embodiments, it is important to determine in which operation the MR-DC filtering for late drop is applied. The embodiment is characterized in that the UE identifies all pieces of filtering information, for example, FreqBandList and MR-DC dedicated filtering (mr-dc filter: NE-DC, NGEN-DC, NR-DC, etc.) before generating candidate band combinations, and proceeds subsequent operations. Alternatively, in a case of generating candidate band combinations, the UE always considers capability for the MR-DC. For example, candidate band combinations, configured by a UE capable of interpreting MR-DC filtering, and candidate band combinations, configured by a UE that cannot interpret the MR-DC filtering, are different.

Referring to the non-limiting examples of FIGS. 1IA and 1IB, the base station may request UE capability by including a request for each of NR 1i-10, MR-DC 1i-15, and LTE 1i-20 in a RAT type for a UE capability enquiry message 1i-05, and each RAT type includes FreqBandList as filtering information for UE capability reporting. For reference, the FreqBandList information has consistency for a case where the MR-DC and the NR SA are requested together. Meanwhile, each RAT type includes independent corresponding FreqBandList information. However, by maintaining the same information (frequency list) in the RAT type, the index of the feature set reported by the UE is maintained the same in the cases of MR-DC and NR SA, and thus the generality of UE reporting can be achieved. If FreqBandList information is different for each RAT type, and particularly, different for the MR-DC and the NR SA, supported band combination, feature set, and feature set combinations are configured according to a RAT type. Accordingly, if the same feature set is indicated by the MR-DC and the NR SA, a problem of using different feature set indices or being incompatible with each other may occur.

In addition, in the above operation, the base station may additionally include filtering (mr-dc filter: NE-DC, NGEN-DC, NR-DC, etc.) requiring MR-DC UE capability for late drop. The filtering information applicable to the UE by the base station in the corresponding operation is as follows.
Include (or omit) EN-DC: A filter for adding or excluding BCs associated with EN-DC if candidate band combinations are generated
Include (or omit) NGEN-DC: A filter for adding or excluding BCs associated with NGEN-DC if candidate band combinations are generated
Include (or omit) NE-DC: A filter for adding or excluding BCs associated with NE-DC to or from the generated candidate band combinations For reference, "Include (or omit) NR-DC" may be configured, but the corresponding filtering may be applied in the NR container without being considered in the MR-DC container. In addition, the include or omit filter may be applied, which leads to the following UE operation.
If IncludeNE-DC filter is included, add NE-DC BC to the candidate band combinations
If OmitNE-DC filter is included, remove and generate BCs associated with NE-DC 1f the candidate band combinations are generated As described above, all MR-DC filtering methods can be unified using a consistent omit filtering method or the Include filter method. In this case, there is an advantage that can be consistently defined in defining the UE operation.

As shown in the illustrative examples of FIGS. 1IA and 1IB, LTE frequencies (L1, L2, L3, L4, L5, and L6) and NR frequencies (N1, LN, N3, N4, N5, and N6) have been assumed to be included in FreqBandList in a situation where all of NR, MR-DC, and LTE are requested. The frequency order indicates priorities, and in the embodiment, the priorities are arranged in the order of L1, L2, L3, L4, L5, L6, N1, LN, N3, N4, N5, and N6. As described above, FreqBandList includes the same information for all RAT types for which UE capability is requested. In addition, an example, in which filtering information (includeNR-DC) requesting NR-DC from the NR container and filtering information (includeNE-DC) requesting NE-DC from the MR-DC container are added to the corresponding filtering information, is described. In addition, since candidate band combinations are generated in consideration of information about MR-DC filtering, if MR-DC filtering is added even for one RAT type, MR-DC filtering information can be included in another RAT type. Alternatively, an empty MR-DC filtering request for the corresponding RAT can be included.

The UE performs an operation of generating UE capability in order of priorities among the NR, MR-DC, and LTE according to a predetermined procedure. For example, the UE first generates candidate band combinations by making reference to NR-DC filtering information and FreqBandList for the NR. Alternatively, in this operation, the UE may generate candidate band combinations so as to always cover all MR-DCs. Here, all candidate band combinations supporting NR SA, NR-DC, and MR-DC are selected as the candidate band combinations in operation 1i-25. The selection of all candidate band combinations supporting MR-DC in operation 1i-25 may have a different result from the selection of all candidate band combinations supporting only EN-DC. This is because "case 2" is considered in embodiment 2. Thereafter, in operation 1i-30, the UE performs filtering of NR, which is the corresponding RAT type, among the selected candidate band combinations and compiles a supportedBandCombinationList including only band combinations supported by an NR band. As shown in operation 1i-35, the UE may generate a featureset combination associated with the supportedBandCombinationList and may generate and configure featuresets that may be included in the featureset combination. As can be identified in operations 1i-30 and 1i-35, featureset combinations and BCs in the supportedBandCombinationList are not always mapped 1:1 to each other, and the featureset combination may be configured to be mapped to multiple BCs. This is because not all BCs are configured with different UE capabilities, but even though the BCs are different, UE capabilities in the corresponding BCs are the same in many cases. As shown in operation 1i-40, the UE makes reference to the final candidate band combination list and configures a list of "candidate feature set combinations" related thereto. The "candidate feature set combinations" include all of feature set combinations for NR SA, NR-DC, and MR-DC BC, and can be obtained from feature set combinations of containers of the UE-NR-Capabilities and the UE-MRDC-Capabilities. Thereafter, the UE generates a featureset configuring the candidate feature set combinations, which includes featuresetDL, featuresetUL, featuresetDLPerCC, featuresetULPerCC, and the like. The above procedure is performed only in the RAT type for NR and EUTRA, and the corresponding operation is not performed in the RAT type for EUTRA-NR. This is because the featureset for an NR part of the MR-DC is transmitted to the NR container, and the featureset for an LTE part of the MR-DC is transmitted to the LTE container, and thus redundant signaling is not necessary. The supportedBandCombinationList, featureSetCombination, and featureSets, which are obtained in the above operation, may be included in the NR container (UE-NR-Capabilities).

As shown in operation 1i-50, the UE generates candidate band combinations by making reference to MR-DC filtering information and FreqBandList for MR-DC according to the priorities defined. According to various embodiments, all candidate band combinations supporting NR SA and MR-DC are selected as the candidate band combinations. If it is clearly defined, the procedure of generating candidate band combinations in this operation has a different result from the case of generating BCs supporting EN-DC. In addition, in a procedure, since "case 2" is considered, it is different from generating of candidate band combinations for EN-DC BC. Thereafter, in operation 1i-55, the UE performs a filtering procedure for a RAT type that needs to be actually reported for the selected candidate band combinations. In operation 1i-55, filtering information applicable to the UE by the base station is as follows.

Omit EN-DC: A filter for excluding BCs associated with EN-DC from the generated candidate band combinations Include (or omit) NGEN-DC: A filter for adding or excluding BCs associated with NGEN-DC to or from the generated candidate band combinations Include (or omit) NE-DC: A filter for adding or excluding BCs associated with NE-DC to or from the generated candidate band combinations For reference, "Include (or omit) NR-DC" may be configured, but the corresponding filtering may be applied in the NR container without being considered in the MR-DC container. In addition, an include or an omit filter may be applied, and the following UE operation can be obtained.

If IncludeNE-DC filter is included, NE-DC BC is maintained in the candidate band combinations If OmitNE-DC filter is included, BCs associated with NE-DC are removed from the candidate band combinations As described above, all of MR-DC filtering methods can be unified using a consistent Omit filtering method. In this case, the UE operation can be consistently defined.

Further, there is a need for a base station operation of determining whether the omitEN-DC filter can be used alone. For example, the base station operation includes a case where, if the base station requests UE capability for MR-DC, only the omitEN-DC filter is included as filtering information. In the embodiment, if the corresponding filtering is applied, none of the supportedBandCombinationList and feature set combinations transmitted through the MR-DC container actually exists. In addition, a Rel-15 initial UE (for example, a UE that cannot interpret the omitEN-DC) stores and transmits a UE capability for EN-DC BC to the MR-DC container (without applying filtering thereto) according to the existing procedure. For example, the Rel-15 initial UE generates and transmits supportedBandCombinationList and feature set combinations for EN-DC. However, a Rel-15 late-drop UE (for example, a UE that has interpreted omitEN-DC) transfers an empty container to the base station without carrying any information in the MR-DC container. If the Rel-15 initial UE and the late-drop support UE request different operations described above, the base station may configure the omitEN-DC filter alone and transmit the same simultaneously at the request of the MR-DC UE capability. Alternatively, if the above operation is not defined as intended, an operation of forcing the base station not to perform configuring omitEN-DC filter alone and transmitting the same simultaneously at the request of the MR-DC UE capability is required. This is because the forcing operation has the same effect as that of not making a UE capability request for the MR-DC.

In addition, in various embodiment, for example, L2N4 BC may be BC defined only in the NE-DC. This may be an example of "case 2".

Referring to the non-limiting examples of FIGS. 1IA and 1IB, as shown in operation 1i-60, especially for the final candidate band combination having been subjected to filtering of the MR-DC, the UE transfers corresponding bands, a BC except for the fallback BC, to the supportedBandCombinationList for the MR-DC. In addition, if the MR-DC BC is stored in the supportedBandCombinationList, the UE may check which MR-DC the corresponding BC supports. For example, the following four supports can be checked.

EN-DC support
NGEN-DC support
NE-DC support
NR-DC support (which is checked in the supportedBandCombinationList transferred to the NR UE capability container)

For example, it may indicate which MR-DC a BC existing in a specific supportedBandCombinationList can support and a plurality of RAT types can be indicated at the same time.

As shown in operation 1*i*-65, the UE generates feature set combinations applied to the supportedBandCombinationList summarized above, and writes a corresponding ID in each supportedBandCombinationList. The information generated above is stored in the MR-DC UE capability container.

The UE re-identifies FreqBandList for LTE according to a predefined priority in operation 1*i*-70 and generates candidate band combinations for LTE. Here, all candidate band combinations supporting NR SA, NR-DC, and MR-DC are selected as the candidate band combinations. Thereafter, in operation 1*i*-75, the UE performs filtering of the corresponding RAT type for LTE, for example, filtering of the MR-DC BC, among the selected candidate band combinations. Then, the UE generates feature sets and feature set combinations, applied to the band combinations supported by the LTE band, in operation 1*i*-80. The generated pieces of information are stored in the LTE UE capability container. In the above operation, since, in LTE, LTE standalone BC, that is, BC information relating to LTE CA is not included, but only BC information relating to MR-DC is included, supportedBandCombinationList is not added separately. That is, the supportedBandCombinationList is already included in the MR-DC container.

FIG. 1JA illustrates an example of a procedure of configuring a UE capability, for example, such as proposed in embodiment 3, and illustrates an operation of UE capability reporting by a UE if a plurality of RAT types including UE capability for MR-DC are requested via one UECapabilityEnquiry according to certain embodiments of this disclosure. FIG. 1JB illustrates an example of configuring a UE capability, for example, such as proposed in embodiment 3, and illustrates an operation of UE capability reporting by a UE if a plurality of RAT types including UE capability for MR-DC are requested via one UECapabilityEnquiry according to certain embodiments. As used herein, embodiment 3 describes a situation to which "case 2" described above is applied. In addition, since the embodiment focuses on the UE capability request procedure for the MR-DC, the description of the NR RAT type is not different from the procedure described in FIGS. 1GA and 1GB. For reference, FIGS. 1GA and 1GB are summarized as the request for EN-DC not the request for MR-DC. A feature of embodiments, such as described below is that NE-DC BC (or NGEN-DC BC), unlike EN-DC BC, is expressed as a separate BC, and in case of generating candidate band combinations, the UE generates candidate band combinations without considering filtering of the MR-DC, like existing Rel-15 initial UE. In other words, it is important to determine in which operation MR-DC filtering for late drop is applied. Certain embodiments, as described with reference to FIGS. 1JA and 1JB are characterized in that the UE identifies all pieces of filtering information, for example, FreqBandList and MR-DC dedicated filtering (mr-dc filter: NE-DC, NGEN-DC, NR-DC, etc.) after generating candidate band combinations, and proceeds subsequent operations. For example, candidate band combinations, configured by a UE capable of interpreting MR-DC filtering, and candidate band combinations, configured by a UE that cannot interpret MR-DC filtering, are not different.

According to some embodiments, the base station may request UE capability by including a request for each of NR 1*j*-10, MR-DC 1*j*-15, and LTE 1*j*-20 in the RAT type for a UE capability enquiry message 1*j*-05, and each RAT type includes FreqBandList as filtering information for UE capability reporting. For reference, the FreqBandList information has consistency for a case where the MR-DC and the NR SA are requested together. Meanwhile, each RAT type includes independent corresponding FreqBandList information. However, by maintaining the same information (frequency list) in the RAT type, the index of the feature set reported by the UE is maintained the same in the cases of MR-DC and NR SA, and thus the generality of UE reporting can be achieved. If FreqBandList information is different for each RAT type, and particularly different for the MR-DC and the NR SA, supported band combination, feature set, and feature set combinations are configured according to a RAT type. Accordingly, if the same feature set is indicated by the MR-DC and the NR SA, a problem of using different feature set indices or being incompatible with each other may occur.

In addition, in the above operation, the base station may additionally include filtering (mr-dc filter: NE-DC, NGEN-DC, NR-DC, etc.) requiring MR-DC UE capability for late drop. The filtering information applicable to the UE by the base station in the corresponding operation is as follows.

Include (or omit) EN-DC: A filter for adding or excluding BCs associated with EN-DC if candidate band combinations are generated Include (or omit) NGEN-DC: A filter for adding or excluding BCs associated with NGEN-DC if candidate band combinations are generated Include (or omit) NE-DC: A filter for adding or excluding BCs associated with NE-DC to or from the generated candidate band combinations For reference, "Include (or omit) NR-DC" may be configured, but the corresponding filtering may be applied in the NR container without being considered in the MR-DC container. In addition, an include or an omit filter may be applied, which leads to the following UE operation.

If IncludeNE-DC filter is included, add NE-DC BC to the candidate band combinations If OmitNE-DC filter is included, remove and generate BCs associated with NE-DC 1*f* the candidate band combinations are generated As described above, all MR-DC filtering methods can be unified using a consistent Omit filtering method or the Include filter method. In this case, there is an advantage that can be consistently defined in defining the UE operation.

Referring to the non-limiting examples of FIGS. 1JA and 1JB, LTE frequencies (L1, L2, L3, L4, L5, and L6) and NR frequencies (N1, LN, N3, N4, N5, and N6) have been assumed to be included in a FreqBandList in a situation where all of NR, MR-DC, and LTE are requested. The frequency order indicates priorities, and in the embodiment, the priorities are arranged in the order of L1, L2, L3, L4, L5, L6, N1, LN, N3, N4, N5, and N6. As described above, the FreqBandList includes the same information for all RAT types for which a UE capability is requested. In addition, an example, in which filtering information (includeNR-DC) requesting NR-DC from the NR container and filtering information (includeNE-DC) requesting NE-DC from the MR-DC container are added to the corresponding filtering information, is described. However, in the embodiment, the candidate band combinations are not generated in consideration of information about MR-DC filtering in the operation. For example, like an operation for existing Rel-15 UE, candidate band combinations for EN-DC and NR SA are generated.

In certain embodiments, the UE performs an operation of generating a UE capability in order of priorities among NR, MR-DC, and LTE according to a predetermined procedure. For example, the UE first generates candidate band combinations by making reference to FreqBandList filtering information for the NR. Here, all candidate band combinations supporting NR SA and EN-DC are selected as the candidate band combinations in operation 1j-25. Since embodiment 2 considers "case 2", the selection of all candidate band combinations supporting MR-DC in operation 1j-25 may have a different result from the selection of all candidate band combinations supporting only EN-DC. For example, in operation 1j-25, in order to obtain the same result as that of the existing Rel-15 UE, the candidate band combination generation procedure considering only EN-DC BC, not MR-DC BC, is performed. Thereafter, in operation 1j-30, the UE performs filtering of NR, which is the corresponding RAT type, among the selected candidate band combinations and compiles a supportedBandCombinationList including only band combinations supported by an NR band. As shown in operation 1j-35, the UE may generate a featureset combination associated with the supportedBandCombinationList and may generate and configure featuresets that may be included in the featureset combination. As can be identified in operations 1j-30 and 1j-35, featureset combinations and BCs in the supportedBandCombinationList are not always mapped 1:1 to each other, and the featureset combination may be configured to be mapped to multiple BCs. This is because not all BCs are configured with different UE capabilities, but even though BCs are different, UE capabilities in the corresponding BCs are the same in many cases. As shown in operation 1j-40, the UE makes reference to the final candidate band combination list and configures a list of "candidate feature set combinations" related thereto. The "candidate feature set combinations" include all of feature set combinations for NR SA, NR-DC, and MR-DC BC, and can be obtained from feature set combinations of containers of the UE-NR-Capabilities and the UE-MRDC-Capabilities. Thereafter, the UE generates featureset configuring the candidate feature set combinations, which includes featuresetDL, featuresetUL, featuresetDLPerCC, featuresetULPerCC, and the like. The above procedure is performed only in the RAT type for NR and EUTRA, and the corresponding operation is not performed in the RAT type for EUTRA-NR. This is because, in various embodiments, the featureset for an NR part of the MR-DC is transmitted to the NR container, and the featureset for an LTE part of the MR-DC is transmitted to the LTE container, and thus redundant signaling is not necessary. The supportedBandCombinationList, featureSetCombination, and featureSets, which are obtained in the above operation, may be included in the NR container (UE-NR-Capabilities).

Thereafter, as shown in operation 1j-50, the UE generates candidate band combinations by making reference to FreqBandList for MR-DC again according to the predefined priority. Here, all candidate band combinations supporting NR SA and MR-DC are selected as the candidate band combinations. If it is clearly defined, the procedure of generating candidate band combinations in operation 1j-50 considers only BCs supporting EN-DC. Since the operation of generating the candidate band combinations does not make a reference to MR-DC filtering information, EN-DC BC only is included. The operation is to maintain compatibility between the NR container and the LTE container. In addition, in a procedure, it depends on an operation of generating candidate band combinations for EN-DC BC of the existing Rel-15 UE. The embodiment is characterized by considering "case 2" and considering only EN-DC BCs in a case of generating candidate band combinations. Thereafter, in operation 1j-55, the UE performs a filtering procedure for a RAT type that needs to be actually reported for the selected candidate band combinations. In operation 1j-55, filtering information applicable to the UE by the base station is as follows.

Omit EN-DC: A filter for excluding BCs associated with EN-DC from the generated candidate band combinations Include (or omit) NGEN-DC: A filter for adding or excluding BCs associated with NGEN-DC to or from the generated candidate band combinations Include (or omit) NE-DC: A filter for adding or excluding BCs associated with NE-DC to or from the generated candidate band combinations For reference, "Include (or omit) NR-DC" may be configured, but the corresponding filtering may be applied in the NR container without being considered in the MR-DC container. In addition, an include or an omit filter may be applied, and the following UE operation can be obtained.

If IncludeNE-DC filter is included, additionally add NE-DC BCs to candidate band combinations If the OmitNE-DC filter is included, maintain the existing value without adding BCs associated with NE-DC to candidate band combinations As described above, all of MR-DC filtering methods can be unified using a consistent omit or include filtering method. In this case, the UE operation can be consistently defined.

Further, in certain embodiments, there is a need for a base station operation of determining whether the omitEN-DC filter can be used alone. For example, the base station operation includes a case where, if the base station requests UE capability for MR-DC, only the omitEN-DC filter is included as filtering information. In the embodiment, if the corresponding filtering is applied, none of the supportedBandCombinationList and feature set combinations transmitted through the MR-DC container actually exists. In addition, a Rel-15 initial UE (for example, a UE that cannot interpret the omitEN-DC) stores and transmits a UE capability for EN-DC BC to the MR-DC container (without applying filtering thereto) according to the existing procedure. In other words, the Rel-15 initial UE generates and transmits supportedBandCombinationList and feature set combinations for EN-DC. However, a Rel-15 late-drop UE (for example, a UE that has interpreted omitEN-DC) transfers an empty container to the base station without carrying any information in the MR-DC container. If the Rel-15 initial UE and the late-drop support UE request different operations described above, the base station may configure the omitEN-DC filter alone and transmit the same simultaneously at the request of the MR-DC UE capability. Alternatively, if the above operation is not defined as intended, an operation of forcing the base station not to perform operation of configuring omitEN-DC filter alone and transmitting the same simultaneously at the request of the MR-DC UE capability is required. This is because the forcing operation has the same effect as that of not making a UE capability request for the MR-DC.

Further, in this embodiment, candidate band combinations dedicated to NE-DC may be generated, and in order to instruct generation of the candidate band combinations, in operation 1*j*-60, a separate candidate band combination list is introduced. The list includes BCs that are not supported in common with EN-DC and are dedicated to NE-DC only. For example, BCs may be defined only for NE-DC. As an example, in FIG. 1J, N6 L1 and N4 L2 BCs may be included. This may be an example of "case 2".

As shown in operation 1*j*-65, especially for the final candidate band combination having been subjected to filtering of the MR-DC, the UE transfers corresponding bands, a BC except for the fallback BC, to the supportedBandCombinationList for MR-DC. In addition, in operation 1*j*-70, supportedBandCombinationList-Add for a separate MR-DC (for BC supported only to NE-DC in an example of drawings of the disclosure) may be introduced with reference to a separate candidate band combination list. The list includes BCs that are not supported in common with EN-DCs and that are dedicated to NE-DCs. For example, BCs may be defined only in the NE-DC.

If the MR-DC BC is stored in the supportedBandCombinationList, the UE may check which MR-DC the corresponding BC supports. For example, the following four supports can be checked.

EN-DC support
NGEN-DC support
NE-DC support
NR-DC support (which is checked in the supportedBandCombinationList transferred to NR UE capability container)

For example, it may indicate which MR-DC a BC existing in a specific supportedBandCombinationList can support and a plurality of RAT types can be indicated at the same time.

In operation 1J-75, the UE generates feature set combinations applied to the supportedBandCombinationList summarized above, and writes a corresponding ID in each supportedBandCombinationList. As shown in operation 1*j*-80, the UE generates a featureSetCombinations-Add associated with the supportedBandCombinationList-Add and generates a feature set associated therewith. The feature set may include both NR and LTE parts. The reason for generating the feature set in the MR-DC container is that, unlike the existing embodiment, the feature set is already generated and managed with reference to EN-DC in NR and LTE containers, and thus an additional feature set for NE-DC is generated by and independently managed in MR-DC. Pieces of information generated in the above are stored in a MR-DC UE capability container. In addition, the UE stores the supportedBandCombinationList-Add, generated in operation 1*j*-70, in the MR-DC container, and adds featureSetCombinations-Add and feature set thereto.

As shown in operation 1*j*-95, the UE re-identifies FreqBandList for LTE according to the predefined priority, and generates candidate band combinations for LTE. Here, all candidate band combinations supporting NR SA and EN-DC are selected as the candidate band combinations. Thereafter, as shown in operation 1J-100, the UE performs filtering of the corresponding RAT type for LTE, for example, filtering of the MR-DC BC, among the selected candidate band combinations, and generates feature sets and feature set combinations, applied to the band combinations supported by the LTE band, in operation 1J-105. The generated pieces of information are stored in the LTE UE capability container. In the above operation, since, in LTE, LTE standalone BC, that is, BC information relating to LTE CA is not included, but only BC information relating to MR-DC is included, supportedBandCombinationList is not added separately. That is, the supportedBandCombinationList is already included in the MR-DC container.

FIG. 1K illustrates an example of operations of a UE performing UE capability reporting on an MR-DC, such as applied to embodiments 1 and 2.

Referring to the non-limiting example of FIG. 1K, at operation 1*k*-05, a UE, which is in an RRC connected state, receives a UE capability enquiry message requesting a UE capability report from a base station. The message may include a UE capability request for each RAT type. The request for each RAT type may include requested frequency band information and filtering information for MR-DC. In addition, the UE capability enquiry message may make a request for a plurality of RAT types in one RRC message container, or multiple UE capability enquiry messages including a request for each RAT type may be transmitted to the UE. The UE capability enquiry may be repeated multiple times, and the UE may configure a UE capability information message corresponding to the repeated UE capability enquiry and match a response to the corresponding request to make a report. In certain embodiments of a next generation telecommunication system, a UE capability request for MR-DC including NR, LTE, and EN-DC may be made. For reference, the UE capability enquiry message is generally transmitted initially after the UE establishes a connection. However, the UE capability enquiry message may be requested under any condition if the base station needs.

In the above operation, the UE, which has received a request for UE capability reporting from the base station, identifies configuration of a UE capability to be reported according to frequency band information and a RAT type requested by the base station in operation 1*k*-10. In operation 1*k*-15, the UE identifies whether the FreqBandList and MR-DC related filtering information are included in each RAT type for the UE capability enquiry message requested by the base station. Thereafter, if the MR-DC related filtering information is included therein, the UE generates candidate band combinations using the MR-DC related filtering information, and generates supportedBandCombinationList, featureSetCombinations, and featureSets dedicated to a specific RAT. For reference, the above operation may occur in the NR container, and featureSets are not generated in the MR-DC container. This is because featureSet for MR-DC are generated in NR and LTE containers.

According to various embodiments, pieces of information generated in operations 1*k*-25 are configured in the corresponding RAT type and stored in the UE capability container. Further, the UE identifies whether there is a RAT type, which has not yet been processed and remains, in operation 1*k*-30, and if there is a remaining RAT type that has not been processed, the UE returns to operation 1*k*-10 to perform a repetitive procedure for each RAT type. However, if there is no RAT type, which has not been processed and remains, and the UE capability procedures for all RAT types have been performed, the UE transmits UE capability information, stored in the corresponding UE capability container, to the base station, according to each RAT type, in operation 1*k*-35.

If the UE does not receive MR-DC related filtering information in operation 1*k*-15, the UE generates candidate band combinations by making reference to the received FreqBandList in operation 1*k*-40. Here, all candidate band combinations supporting NR SA and MR-DC are selected as the candidate band combinations. In operation 1*k*-45, the UE performs filtering of the corresponding RAT type among candidate band combinations generated (or generated and stored) in operation 1k-45, and generates band combinations, feature sets, and feature set combinations, which are supported by the corresponding RAT. Pieces of information generated in operations 1k-50 are configured in the corresponding RAT type and stored in the UE capability container. Further, in operation 1k-55, the UE identifies whether there is a RAT type, which has not been processed yet and remains, and if there is a remaining RAT type, the UE returns to operation 1k-10 and performs a repetitive procedure for each RAT type. However, if there is no remaining RAT type and the UE capability procedures for all RAT types have been performed, the UE transmits UE capability information, which is stored in the corresponding UE capability container according to each RAT type, to the base station, in operation 1k-60.

FIG. 1L illustrates an example of operations of a UE performing UE capability reporting on an MR-DC according to various embodiments of this disclosure, for example, as applied to embodiment 3.

Referring to the non-limiting example of FIG. 1L, at operation 1l-05, a UE, which is in an RRC connected state, receives a UE capability enquiry message requesting a UE capability report from a base station. The message may include a UE capability request for each RAT type. The request for each RAT type may include requested frequency band information and filtering information for MR-DC. In addition, the UE capability enquiry message may make a request for a plurality of RAT types in one RRC message container, or multiple UE capability enquiry messages including a request for each RAT type may be transmitted to the UE. The UE capability enquiry may be repeated multiple times, and the UE may configure a UE capability information message corresponding to the repeated UE capability enquiry and match a response to the corresponding request to make a report. In various embodiments of a next generation telecommunication system, a UE capability request for MR-DC including NR, LTE, and EN-DC may be made. For reference, the UE capability enquiry message is generally transmitted initially after the UE establishes a connection. However, the UE capability enquiry message may be requested under any condition if the base station needs.

The UE, which has received a request for UE capability reporting from the base station in operation 1l-05, identifies configuration of UE capability to be reported according to band information and a RAT type requested by the base station in operation 1l-10. In operation 1l-15, the UE generates candidate band combinations by making reference to the received FreqBandList. In operation 1l-15, the UE generates candidate band combinations based on EN-DC, and does not cover NE-DC BC generated differently from the EN-DC. In operation 1l-20, the UE identifies whether MR-DC related filtering information and FreqBandList are included in each RAT type for the UE capability enquiry message requested by the base station. Thereafter, if the MR-DC related filtering information is included, the UE generates candidate band combinations using the MR-DC related filtering information, and generates supportedBandCombinationList, featureSetCombinations, and featureSets dedicated to a specific RAT. For reference, the above operation may occur in the NR container, and the featureSets are not generated in the MR-DC container. This is because featureSets for MR-DC are generated in NR and LTE containers. In operation 1l-20, the UE may generate supportedBandCombinationList-Add and featureSetCombinations-Add, dedicated to NE-DC.

Pieces of information generated in operations 1l-30 are configured in the corresponding RAT type and stored in the UE capability container. Further, the UE identifies whether there is a RAT type, which has not yet been processed and remains, in operation 1l-35, and if there is a remaining RAT type that has not been processed, the UE returns to operation 1k-10 to perform a repetitive procedure for each RAT type. However, if there is no RAT type, which has not been processed and remains, and UE capability procedures for all RAT types have been performed, the UE transmits UE capability information, stored in the corresponding UE capability container, to the base station, according to each RAT type, in operation 1l-40.

If the UE does not receive MR-DC related filtering information in operation 1l-20, the UE performs filtering of the corresponding RAT type among candidate band combinations generated (or generated and stored) in operation 1l-45, and generates band combinations, feature sets, and feature set combinations, which are supported by the corresponding RAT. Pieces of information generated in operations 1l-50 are configured in the corresponding RAT type and stored in the UE capability container. Further, in operation 1l-55, the UE identifies whether there is a RAT type, which has not been processed yet and remains, and if there is a remaining RAT type, the UE returns to operation 1l-10 and performs a repetitive procedure for each RAT type. However, if there is no remaining RAT type and all the UE capability procedures for RAT type are performed, the UE transmits UE capability information, which is stored in the corresponding UE capability container according to each RAT type, to the base station, in operation 1l-60.

FIG. 1M illustrates, in block diagram format, a UE according to various embodiments of this disclosure.

As shown in the illustrative example of FIG. 1M, a UE according to at least one embodiment includes a transceiver 1m-05, a controller 1m-10, a multiplexer and de-multiplexer 1m-15, various types of higher layer processors 1m-20 and 1m-25, and a control message processor 1m-30.

The transceiver 1m-05 receives data and a predetermined control signal through a forward channel of a serving cell and transmits data and a predetermined control signal through a reverse channel. If a plurality of serving cells are configured, the transceiver 1m-05 performs data transmission or reception and control signal transmission or reception through the plurality of serving cells. The multiplexer and de-multiplexer 1m-15 multiplexes data, which is generated in the higher layer processors 1m-20 and 1m-25 or the control message processor 1m-30, or de-multiplexes data received by the transceiver 1m-05, and transmits the multiplexed data or the de-multiplexed data to a proper higher layer processor 1m-20 or 1m-25 or the control message processor 1m-30. The control message processor 1m-30 transmits or receives a control message to or from the base station and performs necessary operation thereof. The operation includes a function of processing an RRC message and a control message such as MAC CE, and reporting of CBR measurement values and receiving of RRC messages for a resource pool and a UE operation. The higher layer processors 1m-20 and 1m-25 may refer to DRB devices and may be configured according to each service. The higher layer processors 1m-20 and 1m-25 process data, which is generated from user services, such as a file transfer protocol (FTP) or a voice over Internet protocol (VoIP), transmits the processed data to the multiplexer and de-multiplexer 1m-15, or processes data transmitted from the multiplexer and de-multiplexer 1m-15 and transmits the processed data to a higher layer service application. The controller 1m-10 identifies scheduling commands, which is received through the transceiver 1m-05, for example, reverse grants, and controls the transceiver 1m-05 and the multiplexer and de-multiplexer 1m-15 to perform reverse transmission via an appropriate transmission resource at an appropriate time point. Meanwhile, in the above description, the UE is configured by a plurality of blocks and each block performs a different function. However, this is only an example and is not necessarily limited thereto. For example, the controller 1m-10 itself may perform a function performed by the multiplexer and de-multiplexer 1m-15.

On the other hand, the controller 1m-10 is configured to receive, from a base station via the transceiver 1m-05, a user equipment (UE) capability enquiry message including radio access technology (RAT) type information and filtering information, generate at least one candidate band combination (BC) list based on the RAT type information and the filtering information. The controller 1m-10 is configured to generate UE capability information based on the generated combination BC list, and transmit, to the base station via the transceiver 1m-05, the generated UE capability information.

Wherein the RAT type information indicates at least one RAT type for requesting a UE capability and is set to at least one a long term evolution (LTE), a multi radio access technology (MR)-dual connectivity (DC) and a new radio (NR).

Wherein the filtering information includes first information indicating for generating of a candidate BC list for a new radio (NR) evolved universal terrestrial radio access (E-UTRA)(NE-DC) in case that the terminal supports the NE-DC, second information indicating for generating of a candidate BC list for a NR(NR-NR)-DC in case that the terminal supports the NR-DC, and third information indicating for omitting at least one BC associated with a EN(E-URTA-NR)-DC in case that the at least one candidate BC list is generated.

Wherein the third information is included in the filtering information, in case that at least one of the first information and the second information is included in the filtering information.

Meanwhile, the controller 1m-10 is further configured to identify that a MR-DC is set in the RAT type information, and generate a candidate BC list only for the NE-DC, in case that the terminal supports only for the NE-DC.

FIG. 1N illustrates, in block diagram format, an example of a base station according to various embodiments.

Referring to the non-limiting example of FIG. 1N, a base station includes a transceiver 1n-05, a controller 1n-10, a multiplexer and de-multiplexer 1n-20, a control message processor 1n-35, various types of higher layer processors 1n-25 and 1n-30, and a scheduler 1n-15.

The transceiver 1n-05 transmits data and a predetermined control signal via a forward carrier and receives data and a predetermined control signal via a reverse carrier. If a plurality of carriers are configured, the transceiver 1n-05 performs data transmission or reception and control signal transmission or reception via the plurality of carriers. The multiplexer and de-multiplexer 1n-20 multiplexes data, which is generated in the higher layer processors 1n-25 and 1n-30 or the control message processor 1n-30, or de-multiplexes data received by the transceiver 1n-05, and transmits the multiplexed data or de-multiplexed data to a proper higher layer processor 1n-25 or 1n-30, the control message processor 1n-35, or the controller 1n-10. The control message processor 1n-35 receives an instruction from the controller 1n-10, generates a message to be transmitted to the UE, and transmits the message to a lower layer. The higher layer processors 1n-25 and 1n-30 may be configured for each service and for each UE, and may process data generated from user services, such as FTP or VoIP, and transmit the processed data to the multiplexer and de-multiplexer 1n-20, or may process data transmitted from the multiplexer and de-multiplexer 1n-20 and transmit the processed data to a higher layer service application. The scheduler 1n-15 allocates transmission resources to the UE at an appropriate time point in consideration of a buffer state of the UE, a channel state, and an active time of the UE, and processes a signal, which is transmitted to the transceiver by the UE, or performs processing to transmit a signal to the UE.

The controller 1n-10 is an element for performing overall control of a base station. The controller 1n-10 is configured to transmit, to a terminal via the transceiver, a user equipment (UE) capability enquiry message including radio access technology (RAT) type information and filtering information, in case that at least one candidate band combination (BC) list is generated based on the RAT type information and the filtering information, receive, from the terminal via the transceiver, UE capability information which is generated based on the at least one combination BC list.

Wherein the RAT type information indicates at least one RAT type for requesting a UE capability and is set to at least one a long term evolution (LTE), a multi radio access technology (MR)-dual connectivity (DC) and a new radio (NR).

Wherein the filtering information includes first information indicating for generating of a candidate BC list for a new radio (NR) evolved universal terrestrial radio access (E-UTRA)(NE-DC) in case that the terminal supports the NE-DC, second information indicating for generating of a candidate BC list for a NR(NR-NR)-DC in case that the terminal supports the NR-DC, and third information indicating for omitting at least one BC associated with a EN(E-URTA-NR)-DC in case that the at least one candidate BC list is generated.

Wherein the third information is included in the filtering information, in case that at least one of the first information and the second information is included in the filtering information.

Wherein a candidate BC list only for the NE-DC is included in the at least one candidate BC list, in case that the terminal supports only for the NE-DC.

In the above-described detailed embodiments, an element included in the disclosure is expressed in the singular or the plural according to presented detailed embodiments. However, the singular form or plural form is selected appropriately for the presented situation for the convenience of description, and the disclosure is not limited by elements expressed in the singular or the plural. Therefore, either an element expressed in the plural may further include a single element or an element expressed in the singular may further include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by a terminal in a wireless communication system, the method comprising:
receiving, from a base station, a user equipment (UE) capability enquiry message including radio access technology (RAT) type information and filtering information for indicating that one or more candidate band combination (BC) lists for a multi radio access technology (MR)-dual connectivity (DC) to be included or omitted, the RAT type information indicating at least one RAT type for requesting a UE capability;
generating at least one candidate BC list based on the RAT type information and the filtering information;
generating UE capability information based on the at least one candidate BC list; and
transmitting, to the base station, the generated UE capability information.

2. The method of claim 1, wherein the at least one RAT type for requesting the UE capability includes a long term evolution (LTE), the MR-DC, or a new radio (NR).

3. The method of claim 1, wherein the filtering information includes at least one of first information for generating a candidate BC list for a new radio (NR) evolved universal terrestrial radio access (E-UTRA)-dual connectivity (NE-DC), second information for generating a candidate BC list for a NR-DC, or third information for omitting at least one BC associated with an E-URTA-NR (EN-DC).

4. The method of claim 3, wherein the third information is included in the filtering information when at least one of the first information or the second information is included in the filtering information.

5. The method of claim 1, wherein generating the at least one candidate BC list further comprises:
identifying that the MR-DC is set in the RAT type information; and
generating a candidate BC list only for a new radio evolved universal terrestrial radio access—dual connectivity (NE-DC), in case that the terminal supports only for the NE-DC.

6. A method by a base station in a wireless communication system, the method comprising:
transmitting, to a terminal, a user equipment (UE) capability enquiry message including radio access technology (RAT) type information and filtering information for indicating that one or more candidate band combination (BC) lists for a multi radio access technology (MR)-dual connectivity (DC) to be included or omitted, the RAT type information indicating at least one RAT type for requesting a UE capability; and
in case that at least one candidate BC list is generated based on the RAT type information and the filtering information, receiving, from the terminal, UE capability information that is generated based on the at least one candidate BC list.

7. The method of claim 6, wherein the at least one RAT type for requesting the UE capability includes a long term evolution (LTE), the MR-DC, or a new radio (NR).

8. The method of claim 6, wherein the filtering information includes at least one of first information for generating a candidate BC list for a new radio (NR) evolved universal terrestrial radio access (E-UTRA)-dual connectivity (NE-DC), second information for generating a candidate BC list for a NR-DC, or third information for omitting at least one BC associated with an E-URTA-NR (EN-DC).

9. The method of claim 8, wherein the third information is included in the filtering information when at least one of the first information and the second information is included in the filtering information.

10. The method of claim 6, wherein a candidate BC list only for a new radio evolved universal terrestrial radio access-dual connectivity (NE-DC) is included in the at least one candidate BC list, in case that the terminal supports only for the NE-DC.

11. A terminal in a wireless communication system, the terminal comprising:
a transceiver; and
a controller configured to:
receive, from a base station via the transceiver, a user equipment (UE) capability enquiry message including radio access technology (RAT) type information and filtering information for indicating that one or more candidate band combination (BC) lists for a multi radio access technology (MR)-dual connectivity (DC) to be included or omitted, the RAT type information indicating at least one RAT type for requesting a UE capability,
generate at least one candidate BC list based on the RAT type information and the filtering information,
generate UE capability information based on the at least one BC list, and
transmit, to the base station via the transceiver, the generated UE capability information.

12. The terminal of claim 11, wherein the at least one RAT type for requesting the UE capability includes a long term evolution (LTE), the MR-DC, or a new radio (NR).

13. The terminal of claim 11, wherein the filtering information includes at least one of first information for generating a candidate BC list for a new radio (NR) evolved universal terrestrial radio access (E-UTRA)-dual connectivity (NE-DC), second information for generating a candidate BC list for a NR-DC, or third information for omitting at least one BC associated with an E-URTA-NR (EN-DC).

14. The terminal of claim 13, wherein the third information is included in the filtering information when at least one of the first information and the second information is included in the filtering information.

15. The terminal of claim 11, wherein the controller is further configured to:
identify that the MR-DC is set in the RAT type information, and
generate a candidate BC list only for a new radio evolved universal terrestrial radio access—dual connectivity (NE-DC), in case that the terminal supports only for the NE-DC.

16. A base station in a wireless communication system, the base station comprising:
a transceiver; and
a controller configured to:
transmit, to a terminal via the transceiver, a user equipment (UE) capability enquiry message including radio access technology (RAT) type information and filtering information for indicating that one or more candidate band combination (BC) lists for a multi radio access technology (MR)-dual connectivity (DC) to be included or omitted, the RAT type information indicating at least one RAT type for requesting a UE capability, and
in case that at least one candidate BC list is generated based on the RAT type information and the filtering information, receive, from the terminal via the transceiver, UE capability information that is generated based on the at least one candidate BC list.

17. The base station of claim 16, wherein the at least one RAT type for requesting the UE capability includes a long term evolution (LTE), the MR-DC, or a new radio (NR).

18. The base station of claim 16, wherein the filtering information includes at least one of first information for generating a candidate BC list for a new radio (NR) evolved universal terrestrial radio access (E-UTRA)-dual connectivity (NE-DC), second information for generating a candidate BC list for a NR-DC, or third information for omitting at least one BC associated with an E-URTA-NR (EN-DC).

19. The base station of claim 18, wherein the third information is included in the filtering information when at least one of the first information and the second information is included in the filtering information.

20. The base station of claim 16, wherein a candidate BC list only for a new radio evolved universal terrestrial radio access-dual connectivity (NE-DC) is included in the at least one candidate BC list, in case that the terminal supports only for the NE-DC.

* * * * *